US011848825B2

(12) United States Patent
Bogado et al.

(10) Patent No.: US 11,848,825 B2
(45) Date of Patent: Dec. 19, 2023

(54) NETWORK VISUALIZATION OF CORRELATIONS BETWEEN LOGICAL ELEMENTS AND ASSOCIATED PHYSICAL ELEMENTS

(71) Applicant: VMware, Inc., Palo Alto, CA (US)

(72) Inventors: Matias Bogado, Mountain View, CA (US); Tarang Khandelwal, Pune (IN); Shrinivas Sharad Parashar, Pune (IN); Priyanka Luthra, Pune (IN); Venkata Ranganath Babu Golla, Pune (IN)

(73) Assignee: VMWARE, INC., Palo Alto, CA (US)

(*) Notice: Subject to any disclaimer, the term of this patent is extended or adjusted under 35 U.S.C. 154(b) by 0 days.

(21) Appl. No.: 17/732,440

(22) Filed: Apr. 28, 2022

(65) Prior Publication Data

US 2022/0263721 A1  Aug. 18, 2022

Related U.S. Application Data

(63) Continuation of application No. 17/185,690, filed on Feb. 25, 2021, now Pat. No. 11,336,533.

(30) Foreign Application Priority Data

Jan. 8, 2021  (IN) .............................. 202141000964

(51) Int. Cl.
*H04L 41/12* (2022.01)
*H04L 41/044* (2022.01)
(Continued)

(52) U.S. Cl.
CPC ............ *H04L 41/12* (2013.01); *H04L 41/044* (2013.01); *H04L 41/22* (2013.01); *H04L 45/38* (2013.01); *H04L 45/586* (2013.01)

(58) Field of Classification Search
CPC . H04L 45/02; H04L 41/0893; H04L 12/4633; H04L 41/12; H04L 12/66;
(Continued)

(56) References Cited

U.S. PATENT DOCUMENTS 5,224,100 A   6/1993  Lee et al.
5,245,609 A   9/1993  Ofek et al.
(Continued)

FOREIGN PATENT DOCUMENTS

EP   1154601 A1   11/2001
EP   1931084 A1    6/2008
(Continued)

OTHER PUBLICATIONS

Non-Published Commonly Owned Related U.S. Appl. No. 17/185,690 with similar specification, filed Feb. 25, 2021, 38 pages, VMware, Inc.

(Continued)

*Primary Examiner* — George C Neurauter, Jr.
*Assistant Examiner* — Linh T. Nguyen
(74) *Attorney, Agent, or Firm* — ADELI LLP

(57) ABSTRACT

Some embodiments of the invention provide a method for providing a visualization of a topology for a logical network implemented in a physical network. The method identifies a set of logical elements of the logical network. For each logical element, the method identifies a set of one or more physical elements in the physical network that implements the logical element. Multiple physical elements are identified for at least one of the logical elements. Through a user interface (UI) the method displays a visualization that includes (1) the set of logical elements, (2) connections between the logical elements, (3) the sets of physical elements that implement each logical element in the set of logical elements, and (4) correlations between each logical (Continued)

element and the set of physical elements that implements the logical element. Each logical element and each physical element is represented by a node in the visualization.

18 Claims, 9 Drawing Sheets

(51) Int. Cl.
*H04L 45/586* (2022.01)
*H04L 45/00* (2022.01)
*H04L 41/22* (2022.01)

(58) Field of Classification Search
CPC ....... H04L 12/46; H04L 41/22; H04L 41/122; H04L 41/40; H04L 45/04; H04L 45/036; H04L 49/70; H04L 41/147; H04L 41/0866; H04L 41/342; H04L 43/045; H04L 47/2483; H04L 67/1042; H04L 41/044; H04L 45/38; H04L 45/586
See application file for complete search history.

(56) References Cited

U.S. PATENT DOCUMENTS

| | | | |
|---|---|---|---|
| 5,265,092 | A | 11/1993 | Soloway et al. |
| 5,504,921 | A | 4/1996 | Dev et al. |
| 5,550,816 | A | 8/1996 | Hardwick et al. |
| 5,729,685 | A | 3/1998 | Chatwani et al. |
| 5,751,967 | A | 5/1998 | Raab et al. |
| 5,781,534 | A | 7/1998 | Perlman et al. |
| 5,805,819 | A | 9/1998 | Chin et al. |
| 6,104,699 | A | 8/2000 | Holender et al. |
| 6,104,700 | A | 8/2000 | Haddock et al. |
| 6,141,738 | A | 10/2000 | Munter et al. |
| 6,219,699 | B1 | 4/2001 | McCloghrie et al. |
| 6,253,337 | B1 | 6/2001 | Maloney et al. |
| 6,430,160 | B1 | 8/2002 | Smith et al. |
| 6,456,624 | B1 | 9/2002 | Eccles et al. |
| 6,512,745 | B1 | 1/2003 | Abe et al. |
| 6,539,432 | B1 | 3/2003 | Taguchi et al. |
| 6,658,002 | B1 | 12/2003 | Ross et al. |
| 6,680,934 | B1 | 1/2004 | Cain |
| 6,721,334 | B1 | 4/2004 | Ketcham |
| 6,785,843 | B1 | 8/2004 | McRae et al. |
| 6,882,642 | B1 | 4/2005 | Kejriwal et al. |
| 6,941,487 | B1 | 9/2005 | Balakrishnan et al. |
| 6,963,585 | B1 | 11/2005 | Pennec et al. |
| 6,999,454 | B1 | 2/2006 | Crump |
| 7,013,342 | B2 | 3/2006 | Riddle |
| 7,062,559 | B2 | 6/2006 | Yoshimura et al. |
| 7,079,544 | B2 | 7/2006 | Wakayama et al. |
| 7,180,856 | B1 | 2/2007 | Breslau et al. |
| 7,197,572 | B2 | 3/2007 | Matters et al. |
| 7,200,144 | B2 | 4/2007 | Terrell et al. |
| 7,209,439 | B2 | 4/2007 | Rawlins et al. |
| 7,243,143 | B1 | 7/2007 | Bullard |
| 7,283,473 | B2 | 10/2007 | Arndt et al. |
| 7,315,985 | B1 * | 1/2008 | Gauvin ............... G06F 3/00 715/735 |
| 7,342,916 | B2 | 3/2008 | Das et al. |
| 7,360,158 | B1 | 4/2008 | Beeman |
| 7,391,771 | B2 | 6/2008 | Orava et al. |
| 7,450,598 | B2 | 11/2008 | Chen et al. |
| 7,457,870 | B1 | 11/2008 | Lownsbrough et al. |
| 7,463,579 | B2 | 12/2008 | Lapuh et al. |
| 7,478,173 | B1 | 1/2009 | Delco |
| 7,483,370 | B1 | 1/2009 | Dayal et al. |
| 7,555,002 | B2 | 6/2009 | Arndt et al. |
| 7,577,131 | B2 | 8/2009 | Joseph et al. |
| 7,590,133 | B2 | 9/2009 | Tatae et al. |
| 7,602,723 | B2 | 10/2009 | Mandato et al. |
| 7,606,260 | B2 | 10/2009 | Oguchi et al. |
| 7,627,692 | B2 | 12/2009 | Pessi |
| 7,633,955 | B1 | 12/2009 | Saraiya et al. |
| 7,639,625 | B2 | 12/2009 | Kaminsky et al. |
| 7,643,488 | B2 | 1/2010 | Khanna et al. |
| 7,649,851 | B2 | 1/2010 | Takashige et al. |
| 7,706,266 | B2 | 4/2010 | Plamondon |
| 7,710,874 | B2 | 5/2010 | Balakrishnan et al. |
| 7,729,245 | B1 | 6/2010 | Breslau et al. |
| 7,760,735 | B1 | 7/2010 | Chen et al. |
| 7,764,599 | B2 | 7/2010 | Doi et al. |
| 7,792,987 | B1 | 9/2010 | Vohra et al. |
| 7,802,000 | B1 | 9/2010 | Huang et al. |
| 7,808,919 | B2 | 10/2010 | Nadeau et al. |
| 7,808,929 | B2 | 10/2010 | Wong et al. |
| 7,818,452 | B2 | 10/2010 | Matthews et al. |
| 7,826,482 | B1 | 11/2010 | Minei et al. |
| 7,839,847 | B2 | 11/2010 | Nadeau et al. |
| 7,885,276 | B1 | 2/2011 | Lin |
| 7,936,770 | B1 | 5/2011 | Frattura et al. |
| 7,937,438 | B1 | 5/2011 | Miller et al. |
| 7,937,492 | B1 | 5/2011 | Kompella et al. |
| 7,948,986 | B1 | 5/2011 | Ghosh et al. |
| 7,953,865 | B1 | 5/2011 | Miller et al. |
| 7,991,859 | B1 | 8/2011 | Miller et al. |
| 7,995,483 | B1 | 8/2011 | Bayar et al. |
| 8,018,943 | B1 | 9/2011 | Pleshek et al. |
| 8,024,478 | B2 | 9/2011 | Patel |
| 8,027,354 | B1 | 9/2011 | Portolani et al. |
| 8,031,606 | B2 | 10/2011 | Memon et al. |
| 8,031,633 | B2 | 10/2011 | Bueno et al. |
| 8,046,456 | B1 | 10/2011 | Miller et al. |
| 8,054,832 | B1 | 11/2011 | Shukla et al. |
| 8,055,789 | B2 | 11/2011 | Richardson et al. |
| 8,060,875 | B1 | 11/2011 | Lambeth |
| 8,131,852 | B1 | 3/2012 | Miller et al. |
| 8,149,737 | B2 | 4/2012 | Metke et al. |
| 8,155,028 | B2 | 4/2012 | Abu-Hamdeh et al. |
| 8,161,270 | B1 | 4/2012 | Parker et al. |
| 8,166,201 | B2 | 4/2012 | Richardson et al. |
| 8,199,750 | B1 | 6/2012 | Schultz et al. |
| 8,223,668 | B2 | 7/2012 | Allan et al. |
| 8,224,931 | B1 | 7/2012 | Brandwine et al. |
| 8,224,971 | B1 | 7/2012 | Miller et al. |
| 8,254,273 | B2 | 8/2012 | Kaminsky et al. |
| 8,265,062 | B2 | 9/2012 | Tang et al. |
| 8,265,075 | B2 | 9/2012 | Pandey |
| 8,281,067 | B2 | 10/2012 | Stolowitz |
| 8,290,137 | B2 | 10/2012 | Yurchenko et al. |
| 8,306,043 | B2 | 11/2012 | Breslau et al. |
| 8,312,129 | B1 | 11/2012 | Miller et al. |
| 8,339,959 | B1 | 12/2012 | Moisand et al. |
| 8,339,994 | B2 | 12/2012 | Gnanasekaran et al. |
| 8,345,558 | B2 | 1/2013 | Nicholson et al. |
| 8,351,418 | B2 | 1/2013 | Zhao et al. |
| 8,359,576 | B2 | 1/2013 | Prasad et al. |
| 8,456,984 | B2 | 6/2013 | Ranganathan et al. |
| 8,504,718 | B2 | 8/2013 | Wang et al. |
| 8,565,108 | B1 | 10/2013 | Marshall et al. |
| 8,571,031 | B2 | 10/2013 | Davies et al. |
| 8,611,351 | B2 | 12/2013 | Gooch et al. |
| 8,612,627 | B1 | 12/2013 | Brandwine |
| 8,625,594 | B2 | 1/2014 | Safrai et al. |
| 8,625,603 | B1 | 1/2014 | Ramakrishnan et al. |
| 8,625,616 | B2 | 1/2014 | Vobbilisetty et al. |
| 8,644,188 | B1 | 2/2014 | Brandwine et al. |
| 8,645,952 | B2 | 2/2014 | Biswas et al. |
| 8,713,467 | B1 | 4/2014 | Goldenberg et al. |
| 8,750,288 | B2 | 6/2014 | Nakil et al. |
| 8,762,501 | B2 | 6/2014 | Kempf et al. |
| 8,806,005 | B2 | 8/2014 | Miri et al. |
| 8,837,300 | B2 | 9/2014 | Nedeltchev et al. |
| 8,838,743 | B2 | 9/2014 | Lewites et al. |
| 8,929,221 | B2 | 1/2015 | Breslau et al. |
| 8,934,495 | B1 | 1/2015 | Hilton et al. |
| 9,059,926 | B2 | 6/2015 | Akhter et al. |
| 9,197,529 | B2 | 11/2015 | Ganichev et al. |
| 9,226,220 | B2 | 12/2015 | Banks et al. |
| 9,258,195 | B1 * | 2/2016 | Pendleton ............... H04L 41/22 |
| 9,280,448 | B2 | 3/2016 | Farrell et al. |
| 9,282,019 | B2 | 3/2016 | Ganichev et al. |

(56) References Cited

U.S. PATENT DOCUMENTS

| | | |
|---|---|---|
| 9,344,349 B2 | 5/2016 | Ganichev et al. |
| 9,407,580 B2 | 8/2016 | Ganichev et al. |
| 9,602,334 B2 | 3/2017 | Benny |
| 9,658,983 B1 | 5/2017 | Barber et al. |
| 9,729,433 B2 | 8/2017 | Polland |
| 9,860,151 B2 | 1/2018 | Ganichev et al. |
| 9,898,317 B2 | 2/2018 | Nakil et al. |
| 10,044,581 B1 | 8/2018 | Russell |
| 10,181,993 B2 | 1/2019 | Ganichev et al. |
| 10,200,306 B2 | 2/2019 | Nhu et al. |
| 10,225,309 B1 | 3/2019 | Rosenzweig et al. |
| 10,469,342 B2 | 11/2019 | Lenglet et al. |
| 10,608,887 B2 | 3/2020 | Jain et al. |
| 10,728,121 B1 | 7/2020 | Chitalia et al. |
| 10,778,557 B2 | 9/2020 | Ganichev et al. |
| 10,805,239 B2 | 10/2020 | Nhu et al. |
| 11,075,847 B1 | 7/2021 | Kwan et al. |
| 11,128,550 B2 | 9/2021 | Lenglet et al. |
| 11,196,628 B1 | 12/2021 | Shen et al. |
| 11,201,808 B2 | 12/2021 | Ganichev et al. |
| 11,240,163 B2 | 2/2022 | Chen et al. |
| 11,283,699 B2 | 3/2022 | Chen et al. |
| 11,336,533 B1 | 5/2022 | Bogado et al. |
| 11,336,590 B2 | 5/2022 | Nhu et al. |
| 11,558,426 B2 | 1/2023 | Shen et al. |
| 11,570,090 B2 | 1/2023 | Shen et al. |
| 11,620,338 B1 * | 4/2023 | Bullard ............... G06F 16/9035 707/798 |
| 11,677,645 B2 | 6/2023 | Cheng et al. |
| 11,687,210 B2 | 6/2023 | Parashar et al. |
| 11,706,109 B2 | 7/2023 | Cheng et al. |
| 11,711,278 B2 | 7/2023 | Gajjar et al. |
| 2001/0020266 A1 | 9/2001 | Kojima et al. |
| 2001/0043614 A1 | 11/2001 | Viswanadham et al. |
| 2002/0093952 A1 | 7/2002 | Gonda |
| 2002/0112060 A1 | 8/2002 | Kato |
| 2002/0178356 A1 | 11/2002 | Mattila |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0197702 A1 | 10/2003 | Turner et al. |
| 2004/0024879 A1 | 2/2004 | Dingman et al. |
| 2004/0073659 A1 | 4/2004 | Rajsic et al. |
| 2004/0098505 A1 | 5/2004 | Clemmensen |
| 2004/0186914 A1 | 9/2004 | Shimada |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0105524 A1 | 5/2005 | Stevens et al. |
| 2005/0111445 A1 | 5/2005 | Wybenga et al. |
| 2005/0120160 A1 | 6/2005 | Plouffe et al. |
| 2005/0132044 A1 | 6/2005 | Guingo et al. |
| 2005/0149604 A1 | 7/2005 | Navada |
| 2005/0182853 A1 | 8/2005 | Lewites et al. |
| 2005/0220030 A1 | 10/2005 | Nagami et al. |
| 2005/0220096 A1 | 10/2005 | Friskney et al. |
| 2005/0232230 A1 | 10/2005 | Nagami et al. |
| 2006/0002370 A1 | 1/2006 | Rabie et al. |
| 2006/0026225 A1 | 2/2006 | Canali et al. |
| 2006/0028999 A1 | 2/2006 | Iakobashvili et al. |
| 2006/0029056 A1 | 2/2006 | Perera et al. |
| 2006/0037075 A1 | 2/2006 | Frattura et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0206655 A1 | 9/2006 | Chappell et al. |
| 2006/0218447 A1 | 9/2006 | Garcia et al. |
| 2006/0221961 A1 | 10/2006 | Basso et al. |
| 2006/0282895 A1 | 12/2006 | Rentzis et al. |
| 2006/0291388 A1 | 12/2006 | Amdahl et al. |
| 2007/0050763 A1 | 3/2007 | Kagan et al. |
| 2007/0055789 A1 | 3/2007 | Claise et al. |
| 2007/0064673 A1 | 3/2007 | Bhandaru et al. |
| 2007/0097982 A1 | 5/2007 | Wen et al. |
| 2007/0156919 A1 | 7/2007 | Potti et al. |
| 2007/0260721 A1 | 11/2007 | Bose et al. |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0021925 A1 | 1/2008 | Sweeney |
| 2008/0049614 A1 | 2/2008 | Briscoe et al. |
| 2008/0049621 A1 | 2/2008 | McGuire et al. |
| 2008/0049752 A1 | 2/2008 | Grant |
| 2008/0049786 A1 | 2/2008 | Ram et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0112551 A1 | 5/2008 | Forbes et al. |
| 2008/0159301 A1 | 7/2008 | Heer |
| 2008/0240095 A1 | 10/2008 | Basturk |
| 2009/0010254 A1 | 1/2009 | Shimada |
| 2009/0100298 A1 | 4/2009 | Lange et al. |
| 2009/0109973 A1 | 4/2009 | Ilnicki |
| 2009/0116497 A1 | 5/2009 | Varma et al. |
| 2009/0150527 A1 | 6/2009 | Tripathi et al. |
| 2009/0245138 A1 * | 10/2009 | Sapsford ............... G06F 16/904 370/254 |
| 2009/0248895 A1 * | 10/2009 | Archer ............... H04L 12/413 709/241 |
| 2009/0249213 A1 * | 10/2009 | Murase ............... G06F 3/0482 715/735 |
| 2009/0292858 A1 | 11/2009 | Lambeth et al. |
| 2009/0327903 A1 * | 12/2009 | Smith ............... H04L 43/50 715/737 |
| 2010/0128623 A1 | 5/2010 | Dunn et al. |
| 2010/0131636 A1 | 5/2010 | Suri et al. |
| 2010/0188976 A1 | 7/2010 | Rahman et al. |
| 2010/0214949 A1 | 8/2010 | Smith et al. |
| 2010/0232435 A1 | 9/2010 | Jabr et al. |
| 2010/0254385 A1 | 10/2010 | Sharma et al. |
| 2010/0275199 A1 | 10/2010 | Smith et al. |
| 2010/0306408 A1 | 12/2010 | Greenberg et al. |
| 2010/0332626 A1 | 12/2010 | Jönsson et al. |
| 2011/0022695 A1 | 1/2011 | Dalal et al. |
| 2011/0055389 A1 | 3/2011 | Bley |
| 2011/0055710 A1 | 3/2011 | Kirkby et al. |
| 2011/0063979 A1 | 3/2011 | Matthews et al. |
| 2011/0075664 A1 | 3/2011 | Lambeth et al. |
| 2011/0085557 A1 | 4/2011 | Gnanasekaran et al. |
| 2011/0085559 A1 | 4/2011 | Chung et al. |
| 2011/0085563 A1 | 4/2011 | Kotha et al. |
| 2011/0107271 A1 | 5/2011 | Borchardt et al. |
| 2011/0128959 A1 | 6/2011 | Bando et al. |
| 2011/0137602 A1 | 6/2011 | Desineni et al. |
| 2011/0194567 A1 | 8/2011 | Shen |
| 2011/0202920 A1 | 8/2011 | Takase |
| 2011/0261825 A1 | 10/2011 | Ichino |
| 2011/0265023 A1 | 10/2011 | Loomis et al. |
| 2011/0299413 A1 | 12/2011 | Chatwani et al. |
| 2011/0299534 A1 | 12/2011 | Koganti et al. |
| 2011/0299537 A1 | 12/2011 | Saraiya et al. |
| 2011/0305167 A1 | 12/2011 | Koide |
| 2011/0317559 A1 | 12/2011 | Kern et al. |
| 2011/0317696 A1 | 12/2011 | Aldrin et al. |
| 2012/0079478 A1 | 3/2012 | Galles et al. |
| 2012/0151352 A1 * | 6/2012 | S. ............... G06F 3/04817 715/734 |
| 2012/0159454 A1 | 6/2012 | Barham et al. |
| 2012/0182992 A1 | 7/2012 | Cowart et al. |
| 2012/0191432 A1 | 7/2012 | Khataniar et al. |
| 2012/0275331 A1 | 11/2012 | Benko et al. |
| 2012/0287791 A1 | 11/2012 | Xi et al. |
| 2012/0311131 A1 | 12/2012 | Arrasvuori |
| 2012/0314599 A1 | 12/2012 | Vilke et al. |
| 2013/0010600 A1 | 1/2013 | Jocha et al. |
| 2013/0019008 A1 | 1/2013 | Jorgenson et al. |
| 2013/0024579 A1 | 1/2013 | Zhang et al. |
| 2013/0031233 A1 | 1/2013 | Feng et al. |
| 2013/0041934 A1 | 2/2013 | Annamalaisami et al. |
| 2013/0044636 A1 | 2/2013 | Koponen et al. |

(56) References Cited

U.S. PATENT DOCUMENTS

| | | |
|---|---|---|
| 2013/0054761 A1 | 2/2013 | Kempf et al. |
| 2013/0058346 A1 | 3/2013 | Sridharan et al. |
| 2013/0067067 A1 | 3/2013 | Miri et al. |
| 2013/0097329 A1 | 4/2013 | Alex et al. |
| 2013/0125120 A1 | 5/2013 | Zhang et al. |
| 2013/0163427 A1 | 6/2013 | Beliveau et al. |
| 2013/0163475 A1 | 6/2013 | Beliveau et al. |
| 2013/0294249 A1 | 11/2013 | Lin et al. |
| 2013/0332602 A1 | 12/2013 | Nakil et al. |
| 2013/0332983 A1 | 12/2013 | Koorevaar et al. |
| 2013/0339544 A1 | 12/2013 | Mithyantha |
| 2013/0346487 A1 | 12/2013 | Tanimoto |
| 2014/0019639 A1 | 1/2014 | Ueno |
| 2014/0029451 A1 | 1/2014 | Nguyen |
| 2014/0115578 A1 | 4/2014 | Cooper et al. |
| 2014/0119203 A1 | 5/2014 | Sundaram et al. |
| 2014/0126418 A1 | 5/2014 | Brendel et al. |
| 2014/0157405 A1 | 6/2014 | Joll et al. |
| 2014/0177633 A1 | 6/2014 | Manula et al. |
| 2014/0195666 A1 | 7/2014 | Dumitriu et al. |
| 2014/0207926 A1 | 7/2014 | Benny |
| 2014/0219086 A1 | 8/2014 | Cantu' et al. |
| 2014/0281030 A1 | 9/2014 | Cui et al. |
| 2014/0282823 A1 | 9/2014 | Rash et al. |
| 2014/0297846 A1 | 10/2014 | Hoja et al. |
| 2014/0304393 A1 | 10/2014 | Annamalaisami et al. |
| 2014/0317313 A1 | 10/2014 | Okita et al. |
| 2014/0348184 A1 | 11/2014 | Kure |
| 2014/0351415 A1 | 11/2014 | Harrigan et al. |
| 2014/0380176 A1 | 12/2014 | Arquie et al. |
| 2015/0016286 A1 | 1/2015 | Ganichev et al. |
| 2015/0016287 A1 | 1/2015 | Ganichev et al. |
| 2015/0016298 A1 | 1/2015 | Ganichev et al. |
| 2015/0016469 A1 | 1/2015 | Ganichev et al. |
| 2015/0043378 A1* | 2/2015 | Bardgett ............ H04L 12/4641 370/254 |
| 2015/0180755 A1 | 6/2015 | Zhang et al. |
| 2015/0195169 A1 | 7/2015 | Liu et al. |
| 2015/0263899 A1* | 9/2015 | Tubaltsev ............ H04L 45/02 370/254 |
| 2015/0271011 A1 | 9/2015 | Neginhal et al. |
| 2015/0281036 A1 | 10/2015 | Sun et al. |
| 2016/0105333 A1 | 4/2016 | Lenglet et al. |
| 2016/0119204 A1* | 4/2016 | Murasato ............ H04L 12/26 715/735 |
| 2016/0142291 A1 | 5/2016 | Polland |
| 2016/0149791 A1 | 5/2016 | Ganichev et al. |
| 2016/0205174 A1 | 7/2016 | Pitio et al. |
| 2016/0226741 A1 | 8/2016 | Ganichev et al. |
| 2016/0226742 A1 | 8/2016 | Apathotharanan et al. |
| 2016/0274558 A1* | 9/2016 | Strohmenger ......... G05B 15/02 |
| 2016/0323166 A1 | 11/2016 | Pandey et al. |
| 2016/0359712 A1 | 12/2016 | Attar et al. |
| 2016/0359880 A1 | 12/2016 | Pang et al. |
| 2017/0026270 A1 | 1/2017 | Shankar |
| 2017/0093677 A1 | 3/2017 | Skerry et al. |
| 2017/0126728 A1 | 5/2017 | Beam et al. |
| 2017/0171159 A1 | 6/2017 | Kumar et al. |
| 2017/0180423 A1 | 6/2017 | Nimmagadda et al. |
| 2017/0222881 A1 | 8/2017 | Holbrook et al. |
| 2017/0288991 A1 | 10/2017 | Ganesh |
| 2017/0310574 A1* | 10/2017 | Wolting ............. H04L 49/70 |
| 2017/0317954 A1* | 11/2017 | Masurekar ........... H04L 45/04 |
| 2017/0324778 A1 | 11/2017 | Register et al. |
| 2017/0358111 A1 | 12/2017 | Madsen |
| 2017/0373950 A1 | 12/2017 | Szilagyi et al. |
| 2018/0041470 A1 | 2/2018 | Schultz et al. |
| 2018/0062939 A1* | 3/2018 | Kulkarni ............. H04L 12/24 |
| 2018/0063188 A1 | 3/2018 | Karin et al. |
| 2018/0091388 A1 | 3/2018 | Levy et al. |
| 2018/0102959 A1 | 4/2018 | Ganichev et al. |
| 2018/0123903 A1* | 5/2018 | Holla ................ H04L 12/24 |
| 2018/0124171 A1 | 5/2018 | Han et al. |
| 2018/0136798 A1 | 5/2018 | Aggour et al. |
| 2018/0219751 A1 | 8/2018 | Cavuto et al. |
| 2018/0262447 A1* | 9/2018 | Nhu ................ H04L 12/931 |
| 2018/0262594 A1* | 9/2018 | Nhu ................ H04L 41/12 |
| 2018/0309637 A1 | 10/2018 | Gill et al. |
| 2018/0373961 A1* | 12/2018 | Wang ............... H04L 41/16 |
| 2018/0375728 A1 | 12/2018 | Gangil et al. |
| 2019/0014029 A1 | 1/2019 | Burgio et al. |
| 2019/0109769 A1 | 4/2019 | Jain et al. |
| 2019/0129738 A1 | 5/2019 | Ekbote et al. |
| 2019/0140931 A1 | 5/2019 | Ganichev et al. |
| 2019/0158377 A1 | 5/2019 | Chau |
| 2019/0190804 A1 | 6/2019 | Tang et al. |
| 2019/0306060 A1 | 10/2019 | Sharma |
| 2020/0036636 A1 | 1/2020 | Holla et al. |
| 2020/0067799 A1 | 2/2020 | Lenglet et al. |
| 2020/0106744 A1 | 4/2020 | Miriyala et al. |
| 2020/0136943 A1 | 4/2020 | Banyai et al. |
| 2020/0169476 A1 | 5/2020 | Vela et al. |
| 2020/0186453 A1 | 6/2020 | Zhang et al. |
| 2020/0204457 A1 | 6/2020 | Hu et al. |
| 2020/0210195 A1 | 7/2020 | Lampert et al. |
| 2020/0304389 A1 | 9/2020 | Bauan et al. |
| 2020/0313985 A1 | 10/2020 | Jayakumar et al. |
| 2020/0322243 A1 | 10/2020 | Xi et al. |
| 2020/0322249 A1 | 10/2020 | Liu et al. |
| 2020/0336387 A1 | 10/2020 | Suzuki et al. |
| 2020/0342346 A1 | 10/2020 | Wulff et al. |
| 2021/0014157 A1 | 1/2021 | Zhou |
| 2021/0029059 A1 | 1/2021 | Nhu et al. |
| 2021/0051109 A1* | 1/2021 | Chitalia |
| 2021/0051100 A1 | 2/2021 | Chitalia et al. |
| 2021/0092064 A1 | 3/2021 | Sidebottom et al. |
| 2021/0216908 A1 | 7/2021 | Lu et al. |
| 2021/0218630 A1* | 7/2021 | Lu ................. H04L 12/24 |
| 2021/0218652 A1 | 7/2021 | Raut et al. |
| 2021/0224183 A1 | 7/2021 | Péan et al. |
| 2021/0226875 A1 | 7/2021 | Chen et al. |
| 2021/0226880 A1 | 7/2021 | Ramamoorthy et al. |
| 2021/0226898 A1 | 7/2021 | Chen et al. |
| 2021/0266259 A1 | 8/2021 | Renner, III et al. |
| 2021/0311764 A1 | 10/2021 | Rosoff et al. |
| 2021/0328891 A1 | 10/2021 | Cherkas |
| 2021/0367927 A1 | 11/2021 | Selvaraj et al. |
| 2022/0014451 A1 | 1/2022 | Naik et al. |
| 2022/0021616 A1 | 1/2022 | Amal et al. |
| 2022/0038368 A1 | 2/2022 | Shen et al. |
| 2022/0038501 A1 | 2/2022 | Shen et al. |
| 2022/0103452 A1 | 3/2022 | Ganichev et al. |
| 2022/0103460 A1 | 3/2022 | Yu et al. |
| 2022/0150136 A1 | 5/2022 | Chen |
| 2022/0155948 A1 | 5/2022 | Chaudhari et al. |
| 2022/0165035 A1 | 5/2022 | Cui et al. |
| 2022/0210120 A1 | 6/2022 | Nigam et al. |
| 2022/0217068 A1 | 7/2022 | Chen et al. |
| 2022/0224620 A1 | 7/2022 | Chhabra et al. |
| 2023/0006886 A1 | 1/2023 | Parashar et al. |
| 2023/0023956 A1 | 1/2023 | Gajjar et al. |
| 2023/0039791 A1 | 2/2023 | Paladugu et al. |
| 2023/0087143 A1 | 3/2023 | Cheng et al. |
| 2023/0087454 A1 | 3/2023 | Cheng et al. |
| 2023/0101764 A1 | 3/2023 | Cheng et al. |
| 2023/0123136 A1 | 4/2023 | Deb et al. |
| 2023/0179513 A1 | 6/2023 | Shen et al. |
| 2023/0198859 A1 | 6/2023 | Parashar et al. |

FOREIGN PATENT DOCUMENTS

| | | |
|---|---|---|
| JP | 2002141905 A | 5/2002 |
| JP | 2003069609 A | 3/2003 |
| JP | 2003124976 A | 4/2003 |
| JP | 2003318949 A | 11/2003 |
| WO | 9506989 A1 | 3/1995 |
| WO | 2012126488 A1 | 9/2012 |

(56) References Cited

FOREIGN PATENT DOCUMENTS

WO          2013184846 A1    12/2013
WO          2015005968 A1    1/2015

OTHER PUBLICATIONS

Non-Published Commonly Owned U.S. Appl. No. 17/185,824, filed Feb. 25, 2021, 32 pages, VMware, Inc.
Phaal, Peter, et al., "sFlow Version 5," Jul. 2004, 46 pages, available at http://www.sflow.org/sflow_version_5.txt.
Phan, Doantam, et al., "Visual Analysis of Network Flow Data with Timelines and Event Plots," VizSEC 2007, Month Unknown 2007, 16 pages.
Levin, Anna, et al., "Network Monitoring in Federated Cloud Environment," 2017 IEEE International Conference on Smart Computing, May 29-31, 2017, 6 pages, IEEE, Hong Kong, China.
Non-Published commonly Owned U.S. Appl. No. 18/102,699, filed Jan. 28, 2023, 77 pages, VMware, Inc.
Non-Published commonly Owned U.S. Appl. No. 18/226,776, filed Jul. 27, 2023, 39 pages, VMware, Inc.

\* cited by examiner

NETWORK VISUALIZATION OF CORRELATIONS BETWEEN LOGICAL ELEMENTS AND ASSOCIATED PHYSICAL ELEMENTS

CLAIM OF BENEFIT TO PRIOR APPLICATIONS

This application is a continuation application of U.S. patent application Ser. No. 17/185,690, filed Feb. 25, 2021, now issued as U.S. Pat. No. 11,336,533. U.S. patent application Ser. No. 17/185,690 claims the benefit of Indian Provisional Patent Application 202141000964, filed Jan. 8, 2021. U.S. patent application Ser. No. 17/185,690, now issued as U.S. Pat. No. 11,336,533, is incorporated herein by reference.

BACKGROUND

Today, in the software-defined network (SDN) world, logical elements are configured on top of physical constructs. From a troubleshooting perspective, network administrators would ideally like to co-relate data plane constructs to management plane constructs. However, this information is not readily available in a visual format, and customers often spend a lot of time manually associating this information. Additionally, as the network configuration evolves, customers must also continue manually updating correlations between these constructs. The correlation information is also critical from a configuration perspective such that if a network administrator cannot identify or locate current correlation information, specifically in a visual manner, configuration changes to the network can become difficult. The correlation information can also be helpful for network administrators when troubleshooting network issues (e.g., data message drops).

BRIEF SUMMARY

Some embodiments of the invention provide a visualization of the topology of a logical network that is implemented within a physical network. A method of some embodiments identifies (i) a set of logical elements of the logical network and (ii) for each logical element in the set of logical elements, a set of one or more physical elements of the physical network that implements the logical element. Through a user interface (UI), the method displays a visualization that includes (i) nodes representing the set of logical elements, (ii) connections between the logical elements, (iii) nodes representing the sets of physical elements that implement each logical element, and (iv) correlations between the node representing each logical element and the node(s) representing each set of physical elements that implements that logical element.

In some embodiments, the set of logical elements are organized hierarchically by type of logical element in the visualization, with logical elements that provide a connection to networks external to the logical network displayed at the top of the hierarchy, logical elements that are logical network endpoints displayed at the bottom of the hierarchy, and additional logical elements displayed between the top and the bottom of the hierarchy. Some such embodiments display the logical elements in a pyramid with the sets of physical elements displayed alongside the set of logical elements on the left and right sides of the pyramid. The correlations, in some such embodiments, are displayed as dashed lines between each node representing a logical element and one or more nodes representing the set of physical elements implementing the logical element.

In some embodiments, at least one set of physical elements that implements a particular logical element is represented as a group node indicating a type of physical element and a number of the type of physical element in the physical network that implement the logical element. The group node, in some embodiments, is used when the number of physical elements implementing a particular logical element exceeds a specified threshold value (e.g., five physical elements). For instance, a logical switch might be implemented by a large number (e.g., hundreds or thousands) of software forwarding elements executing on host computers; rather than displaying such a large number of nodes representing the different host computers in the visualization, a single node is displayed that indicates the number of host computers. These group nodes are selectable in some embodiments to cause the visualization to display individual nodes representing the individual members of the group, in order for a user to determine additional information about the individual physical elements. In some embodiments, when the number of physical elements implementing the particular logical element does not exceed the specified threshold value, each physical element is represented in the visualization by an individual node with a dashed line to the particular logical element indicating a correlation between the physical element and the particular logical element.

Similarly, groups of logical elements are represented by a group node in the visualization, according to some embodiments. For example, in some embodiments, when the number of Tier-1 gateways attached to the same Tier-0 gateway exceeds a specified threshold, the Tier-1 gateways are represented in the visualization using a group node. In some embodiments, data compute nodes (e.g., virtual machines (VMs), containers, and physical servers) attached to a logical switch are always displayed as a group node. As described for the group node representing physical elements, selecting the group node representing logical elements can cause the visualization to display nodes representing the individual logical elements (e.g., VMs) that are represented by the group node.

In some embodiments, the visualization displays a first set of nodes with a first appearance (e.g., a first color) and a second set of nodes with a second appearance (e.g., a second color), and the second set of nodes can be selected in a particular manner (e.g., by hovering a cursor over a node in the second set of nodes) to cause the visualization to display a pop-up window that includes information regarding the hovered-over node (e.g., the name of the element represented by the node, the type of logical or physical element represented by the node, etc.).

Some embodiments also include additional information that is specific to the type of element represented by the node. For example, in some embodiments, the information displayed for a Tier-0 gateway specifies whether the gateway is configured in active-active or active-standby mode, while the information for a Tier-1 gateway specifies whether the failover mode for the gateway is preemptive or non-preemptive (i.e., whether a preferred gateway is always active when it is available). For L2 segments, the information in some embodiments specifies whether the segment is a logical switch (i.e., an overlay segment within the logical network) or is a VLAN segment (e.g., for connecting uplinks to external networks), as well as whether the segment is connected to more than one gateway and the number of gateways to which it is connected. In some such embodiments, either type of node can also be selected in a different manner to cause the visualization to display additional information about the represented logical or physical element represented by the selected node.

Examples of the logical elements include different types of gateway logical routers, logical switches, and VMs, while the physical elements, in some embodiments, include host computers on which the VMs or other data compute nodes (i.e., logical network endpoints) execute and which implement logical switches and/or distributed logical routers, as well as physical machines such as edge devices that implement gateway logical routers (specifically, the centralized routing components of logical routers in some embodiments).

Each host computer for hosting the data compute nodes, in some embodiments, executes a managed forwarding element (operating, e.g., within virtualization software of the host machine) that implements the logical networks for the data compute nodes that reside on the host computer. Thus, for example, the managed forwarding element will implement the logical switches to which its data compute nodes attach, as well as distributed routing components of the logical routers to which these logical switches attach, other logical switches attached to those distributed routing components, etc. Logical routers may include centralized routing components (e.g., for providing stateful services and/or connecting to external networks), which are implemented on a separate physical edge device (e.g., as a VM or within a forwarding element datapath of the edge device). The forwarding elements of these hosts may also implement the various logical switches and distributed routing components as needed.

When the same edge device implements multiple gateway logical routers, some embodiments represent the edge device with a single node in the visualization with dashed lines from this node to each gateway logical router implemented by the node. Similarly, when a particular gateway logical router is implemented by multiple edge nodes (but fewer than the threshold value for grouping nodes), some embodiments display dashed lines from each edge device to the particular gateway logical router in some embodiments. It should also be noted that, in many cases, the host computers implementing a particular logical switch will also implement a distributed logical router associated with the gateway logical router to which that switch connects and, conversely, the edge device(s) implementing a gateway logical router also implement the logical switch(es) connected to that gateway logical router.

In addition to providing a visualization of the overall network topology, some embodiments also provide an option for users to perform flow tracing for data message flows between logical network endpoints. When a user initiates (i.e., through the UI) flow tracing for a particular data message flow (e.g., between two VMs), some embodiments perform the flow tracing operation and display a visualization of the path traversed by the data message flow through the logical network. In some embodiments, the path is represented by a hierarchically organized pyramid with a first node representing the source VM shown at the bottom left and a second node representing the destination VM. Any logical elements (generally at least one logical switch, and possibly one or more logical router) through which the data message flow logically traverses are displayed in a hierarchical manner.

Additionally, nodes representing physical elements that implement the logical elements in the pyramid are shown in the visualization on the left and right sides of the pyramid, with dashed lines between nodes representing each physical element and nodes representing the logical elements implemented by the physical element. In some embodiments, the visualization also includes representations of tunnels, with tunnels that have not experienced issues appearing in a first color (e.g., green) and tunnels that have experienced issues appearing in a second color (e.g., red). The visualization also depicts both north-south traffic (e.g., traffic between a VM and an edge of the network that connects to external networks) as well as east-west traffic, according to some embodiments.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
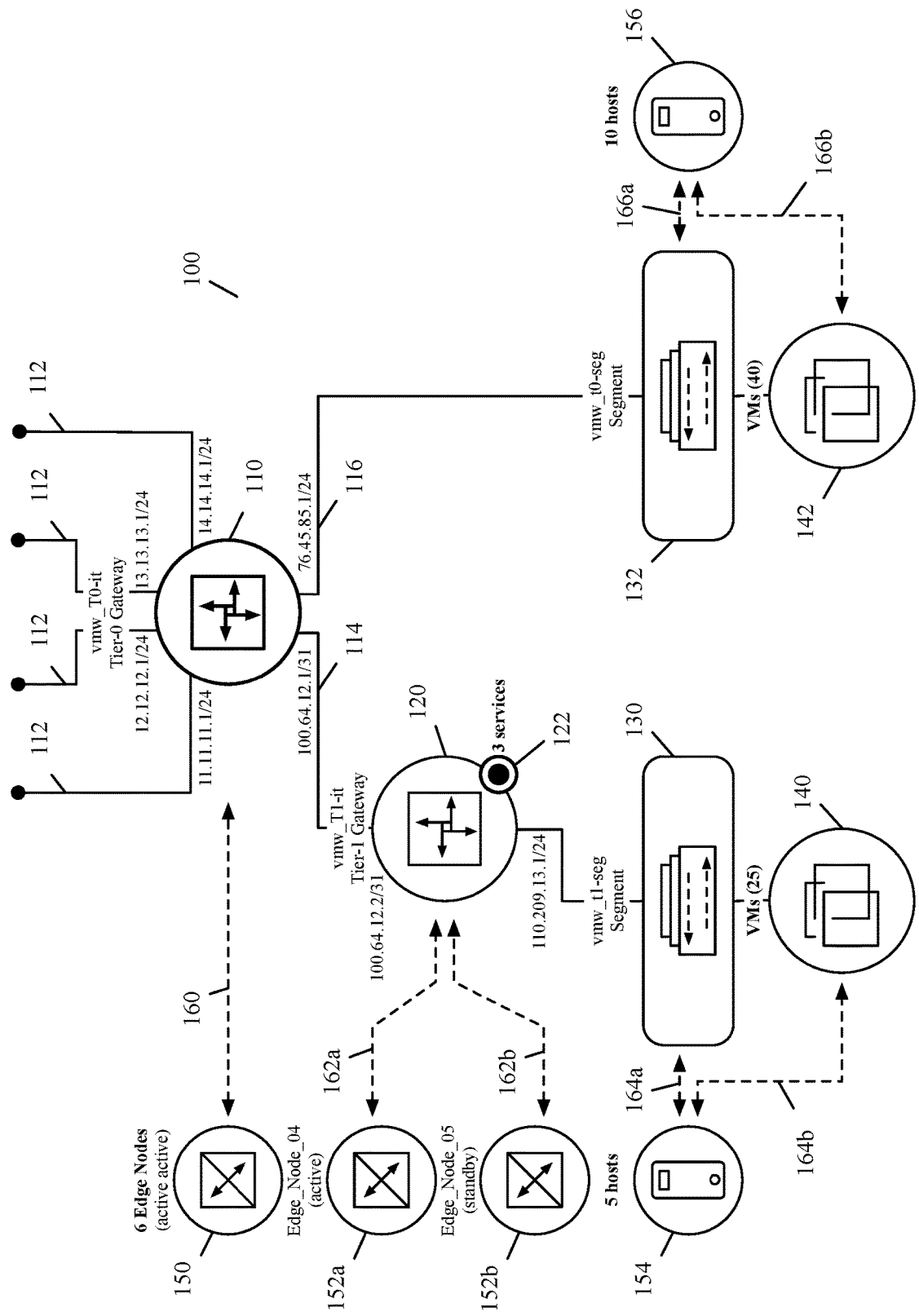
FIG. 1 conceptually illustrates an example UI displaying the topology of a logical network implemented within a physical network, according to some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a visualization of the topology of a logical network that is implemented within a physical network. A method of some embodiments identifies (i) a set of logical elements of the logical network and (ii) for each logical element in the set of logical elements, a set of one or more physical elements of the physical network that implements the logical element. Through a user interface (UI), the method displays a visualization that includes (i) nodes representing the set of logical elements, (ii) connections between the logical elements, (iii) nodes representing the sets of physical elements that implement each logical element, and (iv) correlations between the node representing each logical element and the node(s) representing each set of physical elements that implements that logical element.

In some embodiments, the set of logical elements are organized hierarchically by type of logical element in the visualization, with logical elements that provide a connection to networks external to the logical network displayed at the top of the hierarchy, logical elements that are logical network endpoints displayed at the bottom of the hierarchy, and additional logical elements displayed between the top and the bottom of the hierarchy. Some such embodiments display the logical elements in a pyramid with the sets of physical elements displayed alongside the set of logical elements on the left and right sides of the pyramid. The correlations, in some such embodiments, are displayed as dashed lines between each node representing a logical element and one or more nodes representing the set of physical elements implementing the logical element.

In some embodiments, at least one set of physical elements that implements a particular logical element is represented as a group node indicating a type of physical element and a number of the type of physical element in the physical network that implement the logical element. The group node, in some embodiments, is used when the number of physical elements implementing a particular logical element exceeds a specified threshold value (e.g., five physical elements). For instance, a logical switch might be implemented by a large number (e.g., hundreds or thousands) of software forwarding elements executing on host computers; rather than displaying such a large number of nodes representing the different host computers in the visualization, a single node is displayed that indicates the number of host computers. These group nodes are selectable in some embodiments to cause the visualization to display individual nodes representing the individual members of the group, in order for a user to determine additional information about the individual physical elements. In some embodiments, when the number of physical elements implementing the particular logical element does not exceed the specified threshold value, each physical element is represented in the visualization by an individual node with a dashed line to the particular logical element indicating a correlation between the physical element and the particular logical element.

Similarly, groups of logical elements are represented by a group node in the visualization, according to some embodiments. For example, in some embodiments, when the number of Tier-1 gateways attached to the same Tier-0 gateway exceeds a specified threshold, the Tier-1 gateways are represented in the visualization using a group node. In some embodiments, data compute nodes (e.g., virtual machines (VMs), containers, and physical servers) attached to a logical switch are always displayed as a group node. As described for the group node representing physical elements, selecting the group node representing logical elements can cause the visualization to display nodes representing the individual logical elements (e.g., VMs) that are represented by the group node.

In some embodiments, the visualization displays a first set of nodes with a first appearance (e.g., a first color) and a second set of nodes with a second appearance (e.g., a second color), and the second set of nodes can be selected in a particular manner (e.g., by hovering a cursor over a node in the second set of nodes) to cause the visualization to display a pop-up window that includes information regarding the hovered-over node (e.g., the name of the element represented by the node, the type of logical or physical element represented by the node, etc.).

Some embodiments also include additional information that is specific to the type of element represented by the node. For example, in some embodiments, the information displayed for a Tier-0 gateway specifies whether the gateway is configured in active-active or active-standby mode, while the information for a Tier-1 gateway specifies whether the failover mode for the gateway is preemptive or non-preemptive (i.e., whether a preferred gateway is always active when it is available). For L2 segments, the information in some embodiments specifies whether the segment is a logical switch (i.e., an overlay segment within the logical network) or is a VLAN segment (e.g., for connecting uplinks to external networks), as well as whether the logical switch is connected to more than one gateway and the number of gateways to which it is connected. In some such embodiments, either type of node can also be selected in a different manner to cause the visualization to display additional information about the represented logical or physical element represented by the selected node.

Examples of the logical elements include different types of gateway logical routers, logical switches, and VMs, while the physical elements, in some embodiments, include host computers on which the VMs or other data compute nodes (i.e., logical network endpoints) execute and which implement logical switches and/or distributed logical routers, as well as physical machines such as edge devices that implement gateway logical routers (specifically, the centralized routing components of logical routers in some embodiments).

Each host computer for hosting the data compute nodes, in some embodiments, executes a managed forwarding element (operating, e.g., within virtualization software of the host machine) that implements the logical networks for the data compute nodes that reside on the host computer. Thus, for example, the managed forwarding element will implement the logical switches to which its data compute nodes attach, as well as distributed routing components of the logical routers to which these logical switches attach, other logical switches attached to those distributed routing components, etc. Logical routers may include centralized routing components (e.g., for providing stateful services and/or connecting to external networks), which are implemented on a separate physical edge device (e.g., as a VM or within a forwarding element datapath of the edge device). The forwarding elements of these hosts may also implement the various logical switches and distributed routing components as needed.

When the same edge device implements multiple gateway logical routers, some embodiments represent the edge device with a single node in the visualization with dashed lines from this node to each gateway logical router implemented by the node. Similarly, when a particular gateway logical router is implemented by multiple edge nodes (but fewer than the threshold value for grouping nodes), some embodiments display dashed lines from each edge device to the particular gateway logical router in some embodiments. It should also be noted that, in many cases, the host computers implementing a particular logical switch will also implement a distributed logical router associated with the gateway logical router to which that switch connects and, conversely, the edge device(s) implementing a gateway logical router also implement the logical switch(es) connected to that gateway logical router.

In addition to providing a visualization of the overall network topology, some embodiments also provide an option for users to perform flow tracing for data message flows between logical network endpoints. When a user initiates (i.e., through the UI) flow tracing for a particular data message flow (e.g., between two VMs), some embodiments perform the flow tracing operation and display a visualization of the path traversed by the data message flow through the logical network. In some embodiments, the path is represented by a hierarchically organized pyramid with a first node representing the source VM shown at the bottom left and a second node representing the destination VM. Any logical elements (generally at least one logical switch, and possibly one or more logical router) through which the data message flow logically traverses are displayed in a hierarchical manner.

Additionally, nodes representing physical elements that implement the logical elements in the pyramid are shown in the visualization on the left and right sides of the pyramid, with dashed lines between nodes representing each physical element and nodes representing the logical elements implemented by the physical element. In some embodiments, the visualization also includes representations of tunnels, with tunnels that have not experienced issues appearing in a first color (e.g., green) and tunnels that have experienced issues appearing in a second color (e.g., red). The visualization also depicts both north-south traffic (e.g., traffic between a VM and an edge of the network that connects to external networks) as well as east-west traffic, according to some embodiments.

FIG. 1 illustrates an example of a UI in some embodiments displaying the topology of a logical network implemented by physical elements of a physical network. In some embodiments, the UI 100 is presented by a network visualization application. This network visualization application may be part of a larger network management application (and therefore allow the user to make changes to the logical network) or operate as a stand-alone application, in different embodiments.

As shown, the logical network topology includes a Tier-0 gateway logical router 110, a Tier-1 gateway logical router 120, logical switches 130 and 132, and sets of VMs 140 and 142. Tier-0 gateway logical routers, in some embodiments, provide connections to external networks (e.g., public networks such as the Internet, other logical networks, etc.) for the underlying logical network. Tier-1 gateway logical routers, in some embodiments, segregate different sets of logical switches from each other and, in some cases, provide services for data traffic to and from the logical network endpoints (e.g., VMs) that attach to those logical switches.

The physical network elements implementing the logical network include a set of 6 edge nodes 150 implementing the Tier-0 gateway logical router 110 in active-active mode (i.e., a mode in which the logical gateway is active at all 6 edge nodes), a pair of edge nodes 152a-152b implementing the Tier-1 gateway logical router 120 in active-standby mode (i.e., a mode in which the Tier-1 logical gateway at edge node 152a is active and the Tier-1 logical gateway at edge node 152b is a standby gateway in case of failover), a set of 5 hosts 154 implementing the logical switch 130 and VMs 140, and a set of 10 hosts 156 implementing the logical switch 132 and VMs 142.

The logical network elements are organized hierarchically in a pyramid, as shown, with the network endpoints (in this case, VMs 140-0142) displayed at the bottom corners of the pyramid, and the common logical element through which these different segments of the network communicate (i.e., the Tier-0 gateway logical router 110) at the top center of the pyramid. The physical elements implementing the logical elements are displayed on the left and right sides of the pyramid, with dashed lines between each physical element and the logical element(s) that it implements, as shown. For example, the dashed line 160 represents the correlation between the 6 edge nodes 150 and the Tier-0 gateway logical router 110.

When multiple physical elements represented by multiple nodes implement a single logical element, the correlation is illustrated by dashed lines from each of the physical elements to the single logical element. For example, the dashed lines 162a and 162b represent the correlation between the edge nodes 152a and 152b and the Tier-1 gateway logical router 120.

Similarly, when one physical element (or set of physical elements represented by a group node) implements more than one logical element, the correlations are illustrated by dashed lines from the physical element to each logical element it implements. For instance, the group node representing 5 hosts 154 is shown as implementing the logical switch 130 as well as the VMs 140, and the group node representing 10 hosts 156 is shown as implementing the logical switch 132 as well as the VMs 142. These correlations are represented by the dashed lines 164a and 164b, and 166a and 166b, respectively.

The UI 100 also displays the connections between the logical elements, as well as any connections to networks external to the logical network, as shown. For example, the Tier-0 gateway logical router 110 includes connections 112 to networks external to the logical network (each of these connections representing a different uplink port in some embodiments), as well as connection 114 to the Tier-1 gateway logical router 120 and connection 116 to the logical switch 132 (which attaches directly to the Tier-0 gateway logical router 110, rather than via a Tier-1 logical router). The connections between logical elements are represented using solid lines, which distinguishes these connections from the dashed lines between the physical elements and the logical elements they implement. Other embodiments may represent these connections and correlations in ways other than those shown (e.g., different colors of lines, etc.).

In some embodiments, when the number of a particular type of physical element implementing any particular logical element exceeds a threshold value (e.g., 5 elements), the physical elements of that particular type are represented by a group node. In the UI 100, the 6 edge nodes 150 that implement the Tier-0 gateway logical router 110 are represented by a group node, while the edge nodes 152a and 152b that implement the Tier-1 gateway logical router are represented by individual nodes. When a set of physical elements is represented by a group node, a count indicating the number of physical elements represented by that group node is displayed above the node along with the name of the type of physical element represented, as shown (i.e., 6 edge nodes, 5 hosts, 10 hosts, etc.).

Similarly, when the number of logical elements of a particular type branching off of another logical element exceeds a threshold value, the logical elements of that particular type are represented by a group node, according to some embodiments. As mentioned above, VMs, containers, and physical servers attached to a logical switch are always represented in the UI by a group node, in some embodiments. In the UI 100, the two sets of VMs 140 and 142 are each represented by a respective group node, with the logical element type "VM" indicated along with the number of VMs represented by each of the group nodes (i.e., 25 VMs and 40 VMs). While the counts for each of the logical elements in the group nodes in this example are relatively low, other embodiments may include hundreds of logical elements represented by a group node. In some embodiments, as will be described further below, group nodes (for both logical and physical elements) are selectable, and selecting a group node causes the UI 100 to expand the group node and display all of the elements represented by the group node.

As noted above, the group nodes are selectable in some embodiments. Within the UI 100, selectable items are distinguished from non-selectable items by appearing bolded (e.g., 6 edge nodes, 5 hosts, 10 hosts, 3 services, etc.). In other embodiments, selectable items may be distinguished in a different manner, such as by appearing in a different color than the non-selectable items. For non-selectable nodes, some embodiments of the invention provide information for non-selectable nodes when a user hovers a cursor over the non-selectable node.

In addition to the nodes, connections, and correlations displayed in the UI 100, some embodiments also display indications for services provided by nodes. For example, the Tier-1 gateway logical router node 120 includes a smaller node 122 indicating there are three (3) services provided by the node 120. In some embodiments, hovering over the services node 122, or selecting the services node, causes the UI 100 to display information detailing each of the three services, as will be described further below.

Figure 2:
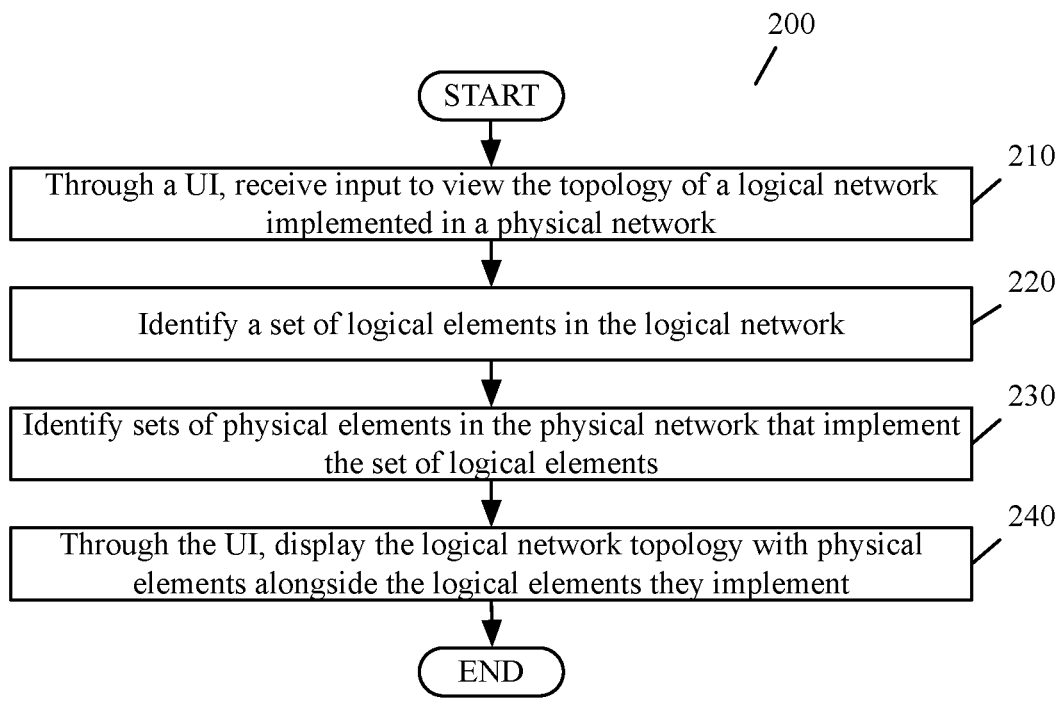
FIG. 2 conceptually illustrates a process performed to provide a visualization of a network topology, according to some embodiments.

FIG. 2 illustrates a process performed by the network visualization application in some embodiments to display a topology of a logical network that is implemented by physical elements of a physical network. The process 200 starts at 210 by receiving, through a UI, input to view the topology of a logical network implemented in a physical network. In some embodiments, this input is received through selection of an option in a network management application (e.g., when an administrator views information about the logical network) or selection of a particular logical network in the network visualization application.

Next, the process identifies, at 220, a set of logical elements in the logical network. For example, the process would identify the gateway logical routers 110 and 120, logical switches 130 and 132, and VMs 140 and 142 displayed in the UI 100. Some embodiments retrieve this information from a database of a network management application that manages the logical network (and possibly many other logical networks).

After identifying the set of logical elements, the process identifies, at 230, sets of physical elements that implement the set of logical elements. In the example UI 100, the process would identify the edge nodes 150 and 152*a*-152*b* and hosts 154 and 156. In some embodiments, the database storing logical network information also stores data mapping each logical network element to the physical elements that implement that logical network element.

After all of the logical and physical elements have been identified, the process displays, at 240, through the UI, the topology of the logical network and physical network elements that implement the logical network elements. The process then ends.

Figure 3:
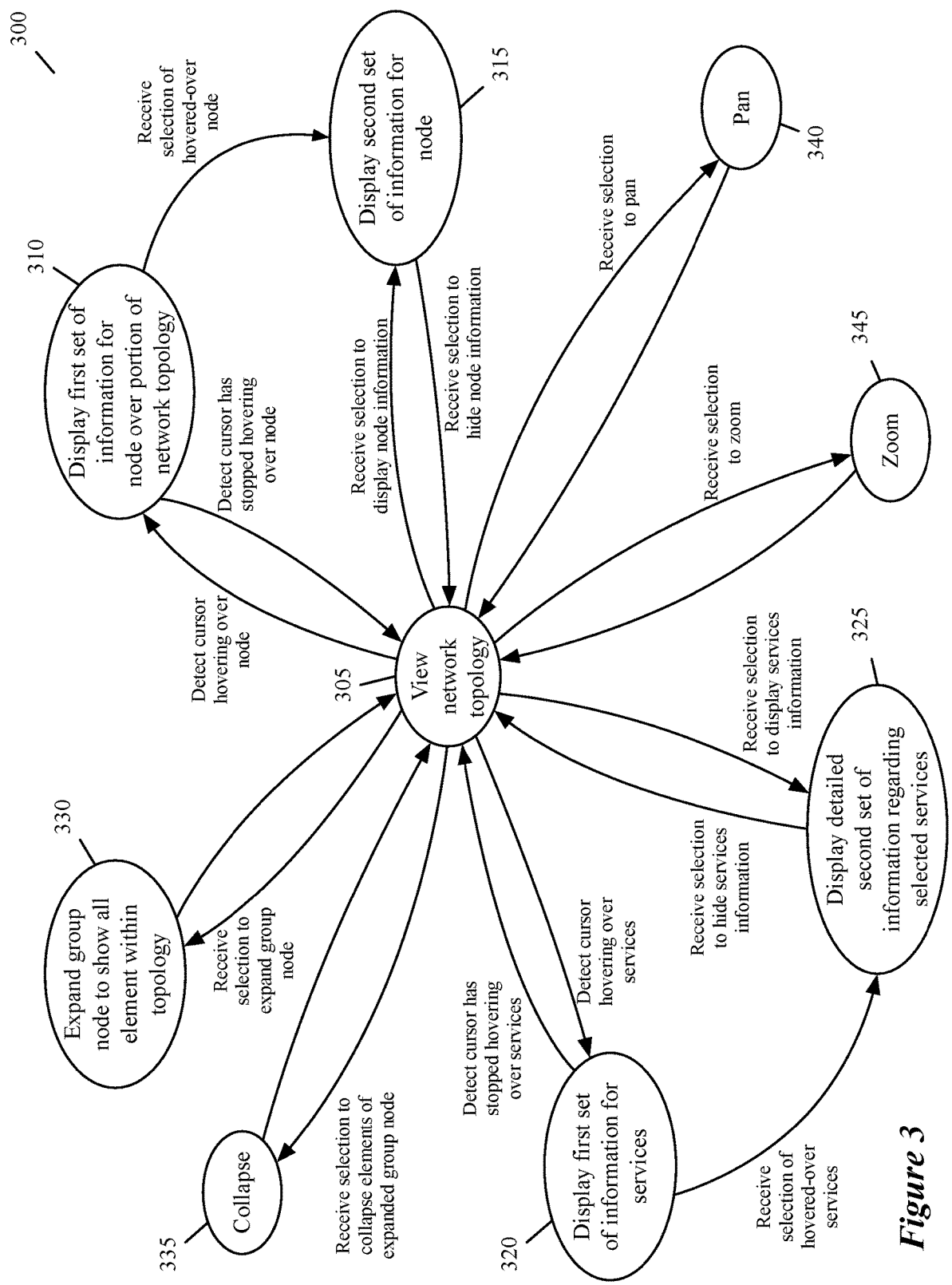
FIG. 3 conceptually illustrates a state diagram describing different states and transitions between these states of the network visualization application of some embodiments.

FIG. 3 illustrates a state diagram describing different states of the UI 100 and transitions between these states in some embodiments of the network visualization application. One of ordinary skill in the art will recognize that some embodiments of the invention will have many different states relating to all different types of input events, and that the state diagram 300 is specifically focused on a subset of these events. One of ordinary skill in the art will further recognize that various interactions, such as cursor controller gestures and button clicks, keyboard input, touchpad/trackpad input, etc., may be used for selection operations described herein. The state diagram 300 will be described below with reference to FIGS. 1 and 4-7.

Initially, the network visualization application is in state 305, in some embodiments, displaying the network topology (e.g., the UI 100 of FIG. 1). In some embodiments, state 305 is the initial state of the network visualization application upon a user opening the display after selecting to view a particular network topology (e.g., after the network visualization application performs the operations of process 200), or based on other actions. Initially, the most condensed view of the topology is displayed (i.e., wherever a group of elements is above a threshold number, a group node is displayed), according to some embodiments.

From state 305, a user of the application can perform numerous operations to modify the UI display by hovering a cursor (or performing a similar operation) over any of the nodes shown in the topology. For example, when a user hovers a cursor over a particular node, the network visualization application detects the hovering cursor and transitions to state 310 to display a first set of information for the node over a portion of the network topology.

Figure 4:
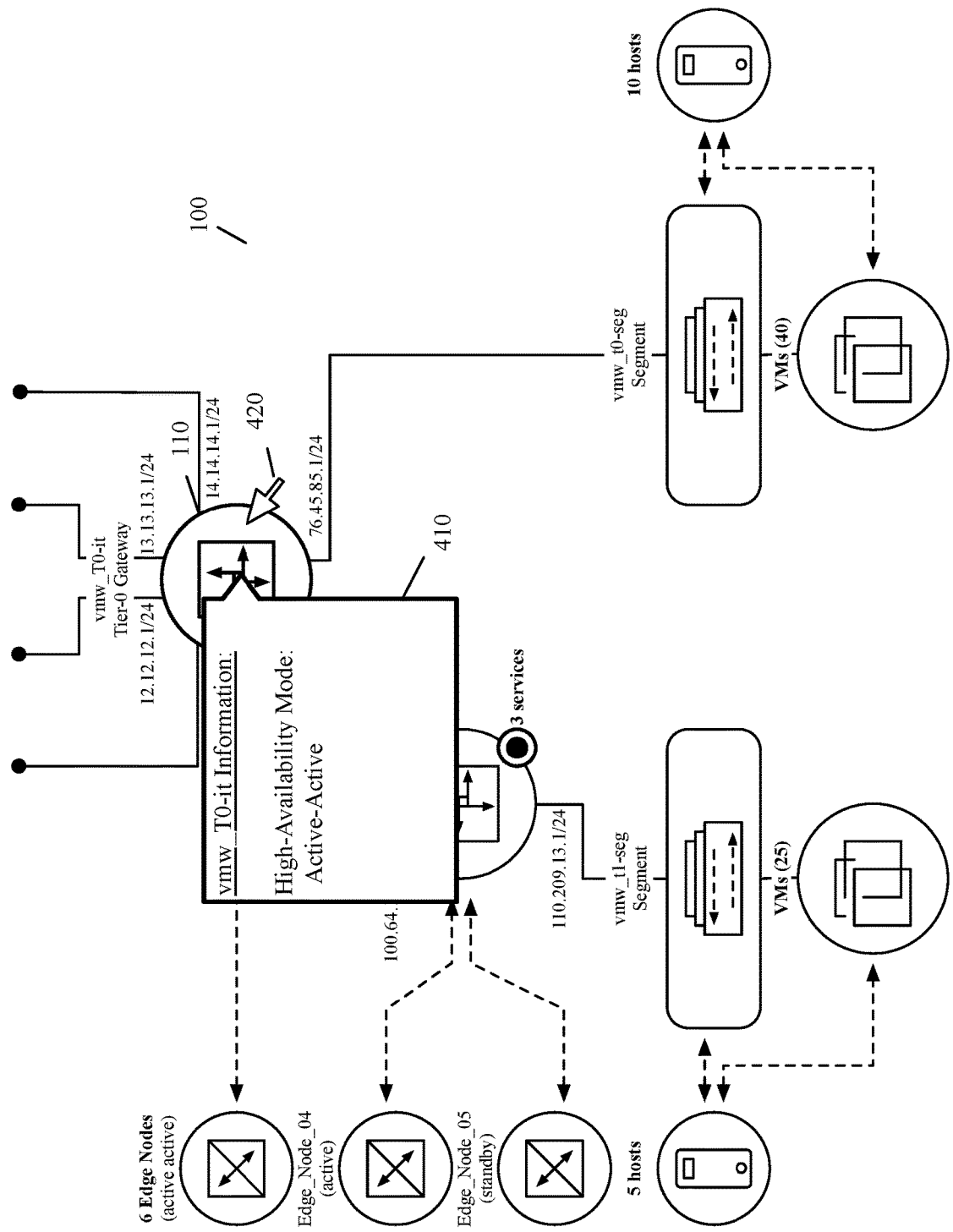
FIG. 4 conceptually illustrates the example UI of FIG. 1 after a user performs a first selection, according to some embodiments.

FIG. 4 illustrates an example of the UI 100 in state 310 when a user hovers a cursor 420 over the Tier-0 gateway logical router node 110, in some embodiments. As shown, the UI 100 now includes a pop-up window 410 stemming from the node 110. The window 410 displays a set of information regarding the node 110, such as the name of the represented element ("vmw T0-it"), the type of element represented ("tier 0 Gateway), and the high-availability mode ("active-active", in this case). Some embodiments of the invention may include additional, less, and/or different information than illustrated in this example. For instance, a node representing a Tier-1 gateway might specify whether the failover mode for the gateway is preemptive or non-preemptive, while a node representing an L2 segment might specify whether the segment is a logical switch or a VLAN segment and whether the segment is connected to more than one gateway (and the number of gateways to which the segment is connected).

When the network visualization application detects that the cursor has stopped hovering over the node, the application returns to state 305 (i.e., removing the additional information from the display). In addition, from state 310, the application can receive a selection of the hovered-over node. When the application receives such a selection, it transitions from state 310 to state 315 to display a second set of information for the node. In some embodiments, this second set of information includes the same information displayed when a user hovers (e.g., with a cursor) over the node, while in other embodiments some additional information about the represented element is displayed. From state 315, the application can receive a selection to hide the node information. When the application receives a selection to hide the node information, the application returns to state 305 to display the network topology.

In some embodiments, certain logical network elements (e.g., Tier-0 and/or Tier-1 logical router gateways) can provide various services (e.g., load balancing services, firewall services, network address translation (NAT) services, VPN services, etc.). As shown above in FIG. 1, the network visualization application indicates which elements provide services in some embodiments, and provides the ability to view additional information about these services. From state 305, the application can detect the cursor is hovering over a node representing services provided by a particular node. When the application detects the cursor hovering over the services node, it transitions to state 320 to display a first set of information describing the services offered. In some embodiments, the first set of information includes a list of the services provided.

Figure 5:
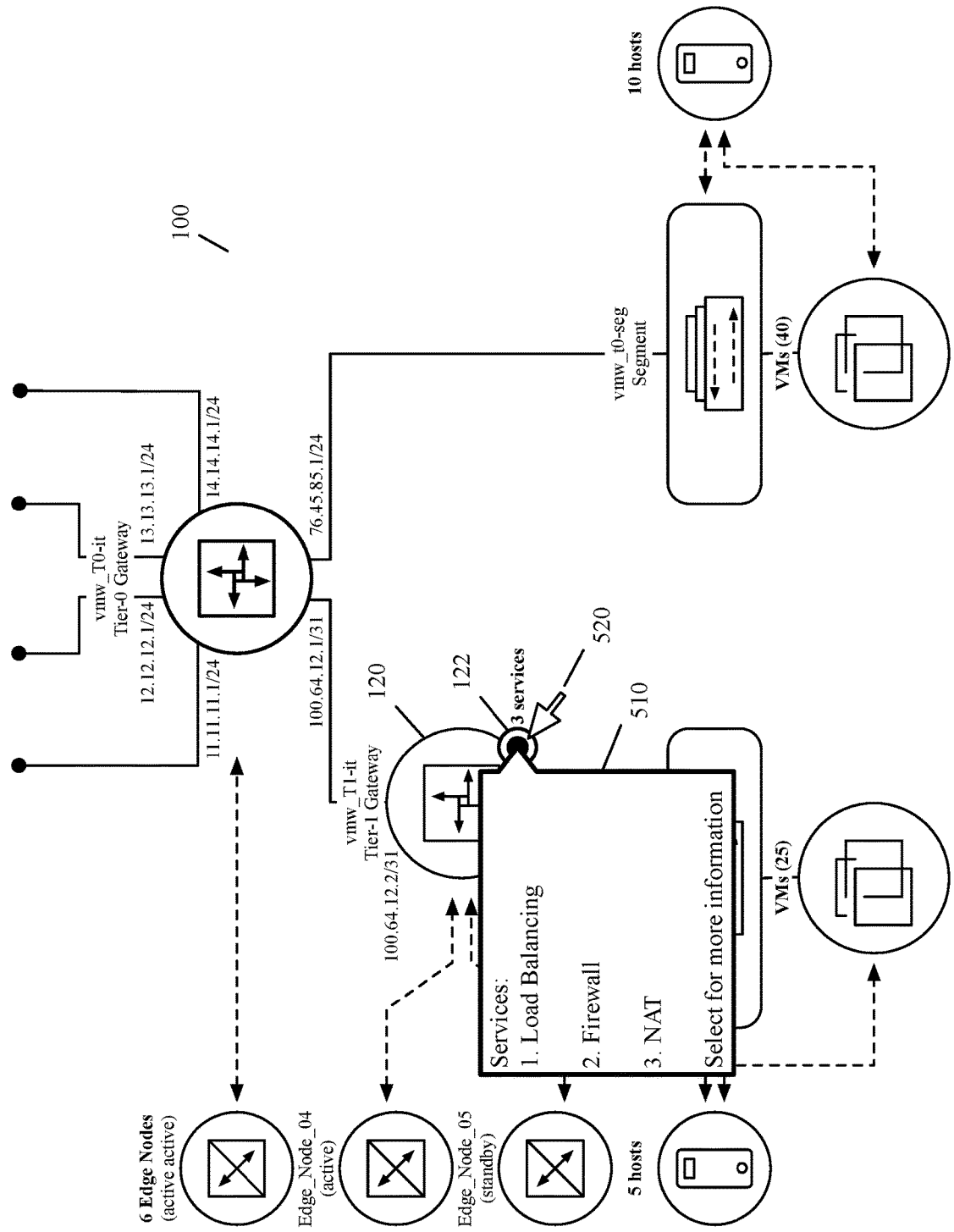
FIG. 5 conceptually illustrates the example UI of FIG. 1 after a user performs a second selection, according to some embodiments.

For example, FIG. 5 illustrates the UI 100 after a user hovers a cursor 520 over the services node 122 of the Tier-1 gateway logical router node 120, in some embodiments. The UI 100 now includes a window 510 listing the three services provided by the Tier-1 gateway logical router. While the services in this example include load balancing services, firewall services, and network address translation (NAT) services as shown, other embodiments can include logical elements that offer additional, fewer, and/or different services than those illustrated.

When the network visualization application detects that the cursor has stopped hovering over the node representing services, the application returns to state 305 (i.e., removing the additional information from the display). Additionally, from state 320, the application can receive a selection of the hovered-over services. When such a selection is received, the application transitions to state 325 to display a second, more detailed set of information for the selected services. For example, in some embodiments, a context menu is displayed from which a user can select a specific service and view additional details about the specific service in the context of the logical entity that provides the service. From state 325, the application can receive a selection to hide the services information, and as a result, returns to state 305.

Rather than receiving a selection of a node or service after a user has been hovering a cursor over the node or service, the application can receive a selection of a node and/or service directly from state 305 (i.e., without displaying the first set of information in response to detecting a hovering cursor). In these instances, the application transitions directly from state 305 to state 315 or 325, respectively, to display the information, and returns to state 305 upon receiving a selection to hide the information.

In some embodiments, as also mentioned above, the group nodes are selectable. When the application receives a selection to expand a group node, it transitions from state 305 to state 330 to expand the group node to show all elements represented by the group node within the topology, and then returns to state 305. In some embodiments, instead of adjusting the zoom level, the application pans the UI to show the elements of the expanded group node.

Figure 6:
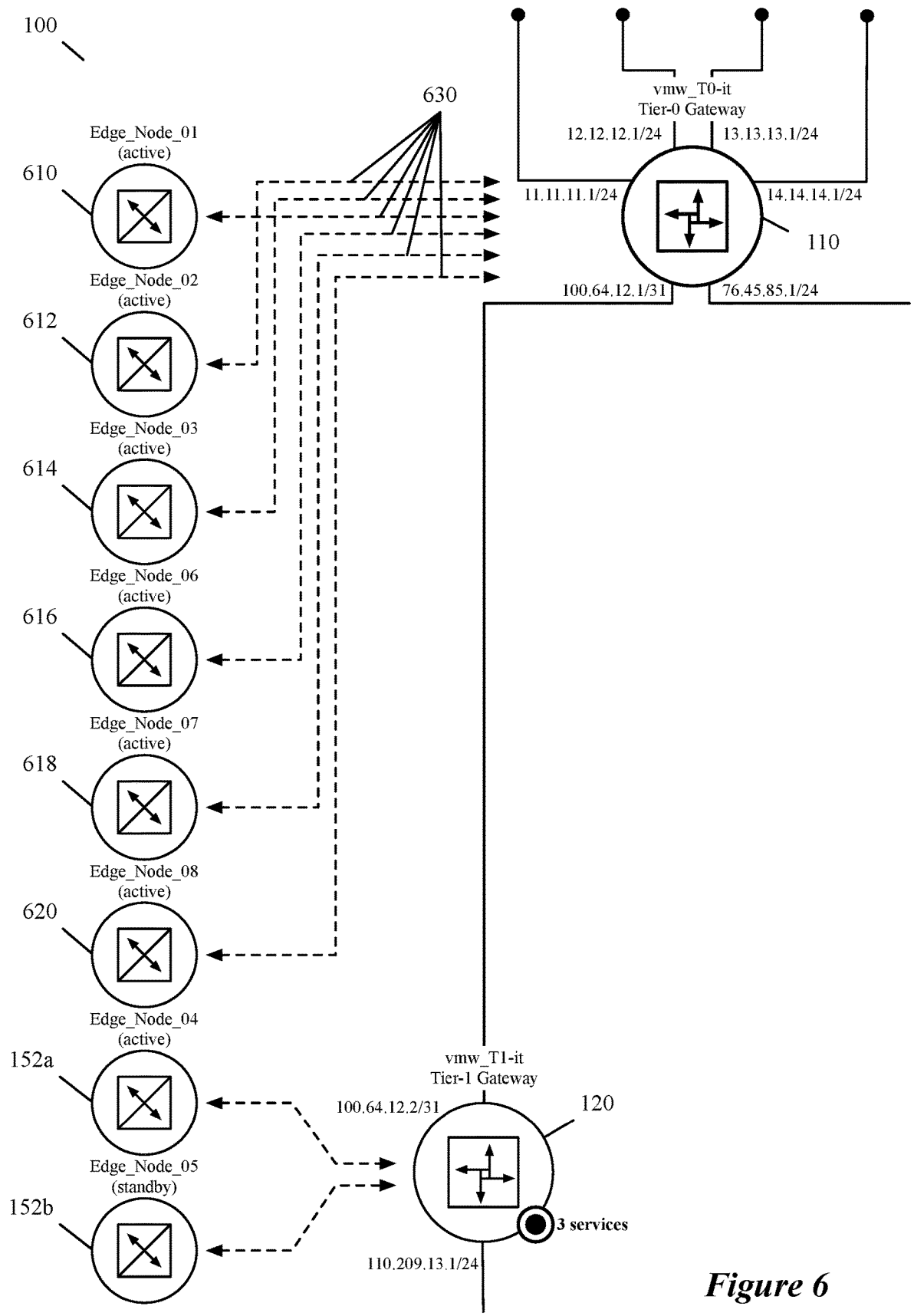
FIG. 6 conceptually illustrates the example UI of FIG. 1 after a user performs a third selection, according to some embodiments.

For example, FIG. 6 illustrates the UI 100 after a user has selected to expand the group node 150 representing six edge nodes that implement the Tier-0 gateway logical router 110. In this example, the group node 150 is now represented as six individual edge nodes 610, 612, 614, 616, 618, and 620, with dashed lines 630 leading from each edge node to the Tier-0 gateway logical router node 110. Additionally, only a subsection of the topology is shown, indicating the UI has panned away from the right side of the topology pyramid to show the edge nodes 610-620 within the display, while the bottom left of the topology pyramid has been pushed down by the expanded group node such that the elements below the Tier-1 gateway logical router node 120 are no longer visible.

Figure 7:
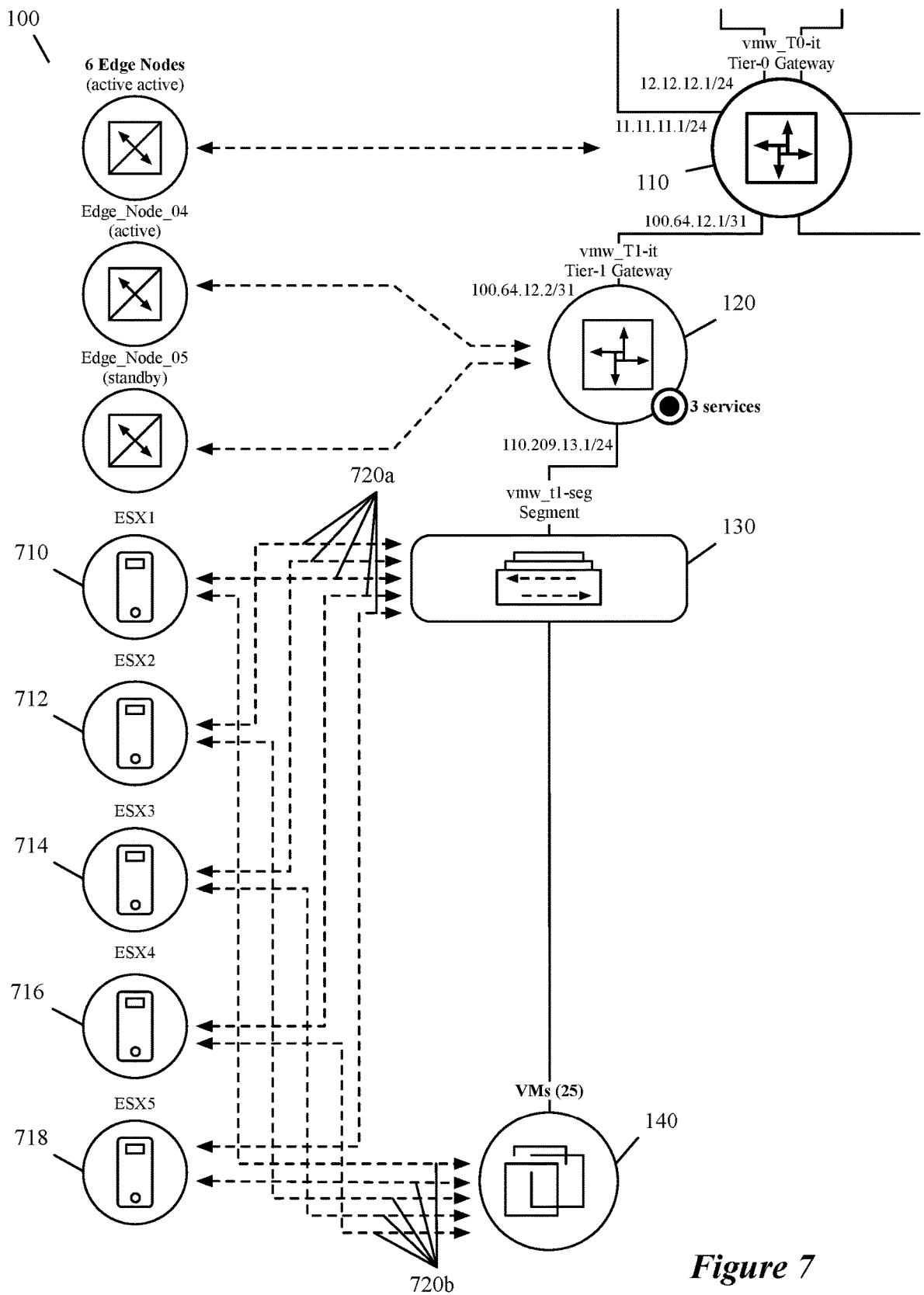
FIG. 7 conceptually illustrates the example UI of FIG. 1 after a user performs a fourth selection, according to some embodiments.

In a second example, FIG. 7 illustrates the UI 100 after a user has selected to expand the group node of 5 hosts 154. As described above for FIG. 1, the hosts of the group node 154 implement the logical switch 130 as well as the VMs 140. Thus, the hosts 710, 712, 714, 716, and 718 each have a first dashed line 720*a* leading from the host node to the logical switch 130 and a second dashed line 720*b* leading from the host node to the VMs 140. Also, like the example in FIG. 6, only a portion of the topology is visible as a result of the expanded group node 154.

From state 305, after a user has selected to expand a group node, the user can then select to collapse the elements of the expanded group node. When the application receives a selection to collapse an expanded group node, it transitions to state 335 to collapse the elements, and then returns back to state 305.

Also, from state 305, users can select to pan the display and zoom in, or out, from the display. When the application receives a selection to pan the display (e.g., to view additional nodes in the topology after expanding a group node), it transitions to state 340 to pan, and then returns to state 305 with the display modified by the pan operation. Similarly, when the application receives a selection to zoom in or out on part of the display (e.g., to view as many elements of the topology in one display as possible, or to focus on a particular node or group of nodes), the application transitions to state 345 to zoom in or out on the display, and then returns to state 305 with the display modified by the zoom operation.

In addition to providing visualizations of network topologies, the network visualization application in some embodiments also provides users with an option to perform flow tracing for data message flows between logical network endpoints and view a visualization of the path between the logical network endpoints. Like the visualizations described above, the flow tracing visualization in some embodiments illustrates both the logical network elements along the path as well as the physical network elements that implement those logical network elements for packets sent along the path.

Also like the visualizations described above, the flow tracing visualization also organizes the logical network elements in a hierarchical pyramid, with the network endpoints displayed at the bottom left and bottom right of the pyramid, the highest logical element in the hierarchy at the top center (e.g., with Tier-0 logical routers being arranged at the top of the hierarchy and logical switches to which VMs connect at the bottom of the hierarchy), and additional logical elements traversed by the flow displayed in between, according to some embodiments. The physical network elements are displayed in the visualization on the left and right sides of the pyramid, with dashed lines between the physical network components and the logical network components they implement, in some embodiments.

In some embodiments, the visualization is provided in a UI in response to input selecting a source logical network endpoint and a destination logical network endpoint. The logical network endpoints may be VMs or other data compute nodes that are attached to a port of a logical switch, uplink ports of a logical router that represent a connection of the logical network to external networks (e.g., the Internet), or other endpoints. These endpoints may be attached to logical ports on the same logical switch, or different logical switches separated by one or more logical routers.

As described above, the physical network elements, in some embodiments, include host computers on which the VMs or other data compute nodes (i.e., logical network endpoints) operate, as well as physical machines that implement, e.g., centralized routing components of logical routers. Each host machine for hosting the data compute nodes, in some embodiments, executes a managed forwarding element (operating, e.g., within virtualization software of the host machine) that implements the logical networks for the data compute nodes that reside on the host machine. Thus, for example, the managed forwarding element will implement the logical switches to which its data compute nodes attach, as well as distributed routing components of the logical routers to which these logical switches attach, other logical switches attached to those distributed routing components, etc. Logical routers may include centralized routing components (e.g., for providing stateful services), which are implemented on a separate physical machine (e.g., as a VM or within a forwarding element datapath on the physical machine). The forwarding elements of these hosts may also implement the various logical switches and distributed routing components as needed.

In physical networks that use first-hop processing (i.e., the first managed forwarding element to process a packet performs logical processing not only for the first logical switch but also any other distributed logical network elements until the packet needs to be either delivered to its destination or sent to a centralized routing component), the physical network element on which the source endpoint operates may implement multiple logical network elements for packets sent from that endpoint. As with the network topology visualization examples described above, physical network elements that implement multiple logical network elements will be illustrated with dashed lines from the physical network element to each logical network element that it implements, according to some embodiments.

The flow tracing visualization in some embodiments also includes information regarding the packet tracing operation from the source endpoint to the destination endpoint, with a visual linking between the packet tracing information and path visualization. The packet tracing operation of some embodiments injects a trace packet that simulates a packet sent from the source endpoint at the first physical element (e.g., the first hop managed forwarding element operating on the same host computer as a source VM). The physical elements along the path process the trace packet as they would an actual packet sent by the source, but in some embodiments, (i) the packet is not actually delivered to its destination and (ii) the physical elements that process the packets send messages to a centralized controller or manager regarding the processing of the packet (e.g., both logical and physical processing).

The messages sent to the controller in some embodiments may indicate that a forwarding element has performed various actions, such as physical receipt of a packet at a particular port, ingress of a packet to a logical forwarding element, logical forwarding of a packet according to a logical forwarding element, application of a firewall, access control, or other rule for a logical forwarding element to a packet, physical forwarding (e.g., encapsulation and output) by a managed physical forwarding element of a packet, dropping a packet, delivery of a packet to its destination endpoint (which is not actually performed, as mentioned), etc. The display of the packet tracing information, in some embodiments, includes a list of these messages, with each message indicating a type (e.g., drop, forward, deliver, receive), a physical network element that sent the message, and a logical network element to which the message relates (if the message is not a purely physical network action).

Figure 8:
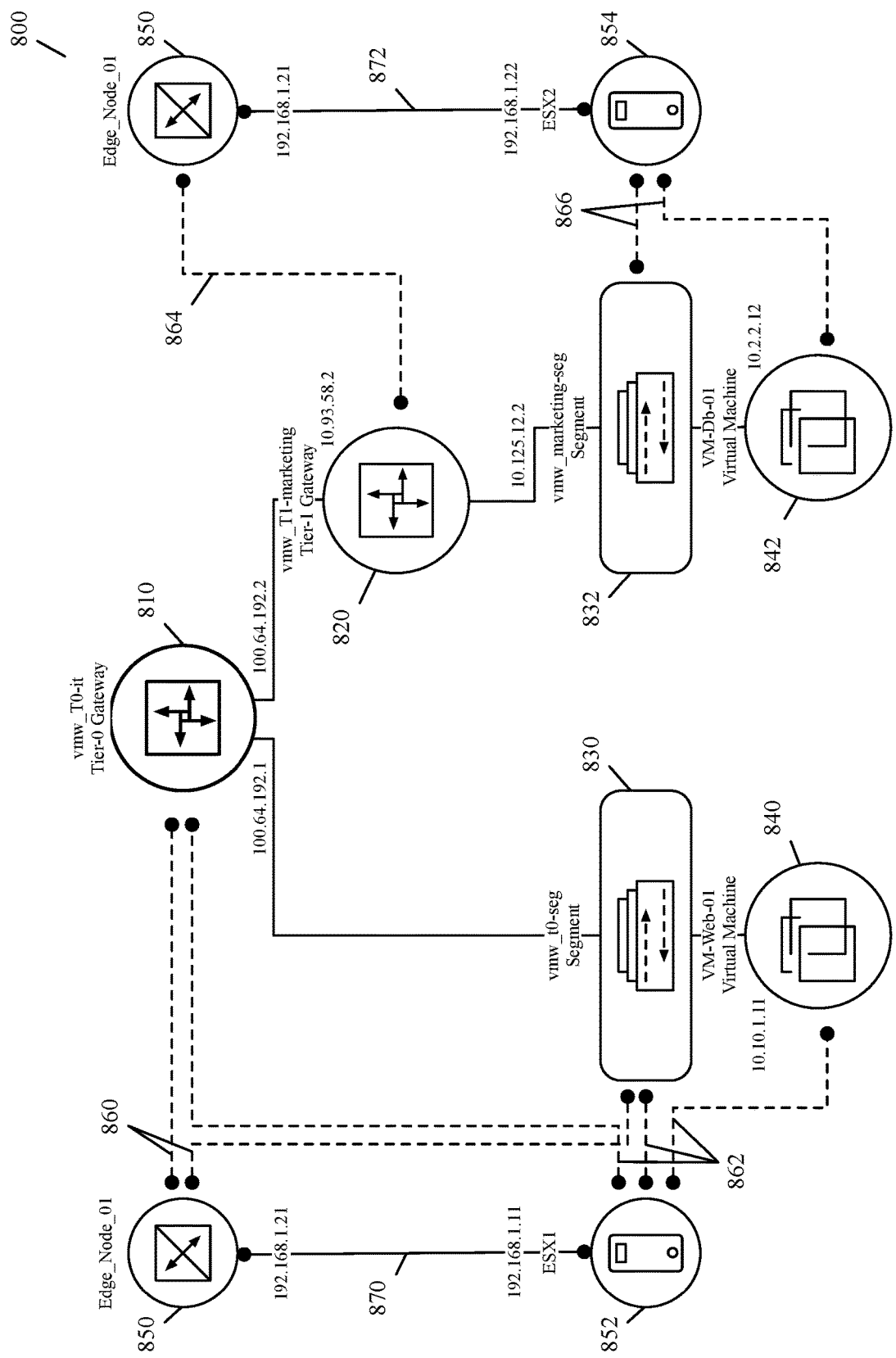
FIG. 8 conceptually illustrates an example UI showing the results of a flow tracing operation, according to some embodiments.

FIG. 8 illustrates a UI 800 displaying a path traversed by a data message flow between two VMs in a logical network. The logical network elements are again organized hierarchically in a pyramid, with the network endpoints (in this case VMs) on the bottom, the highest logical element in the hierarchy at the top center (e.g., with Tier-0 logical routers being arranged at the top of the hierarchy and logical switches to which VMs connect at the bottom of the hierarchy), and physical elements that implement the logical elements on the left and right sides of the pyramid.

The network visualization application in some embodiments always displays the source machine at the bottom left of the pyramid, and the destination machine at the bottom right of the pyramid. In this particular example, the flow tracing was performed for a data message flow between source web VM 840 and destination database VM 842. After leaving the VM 840, data messages of the flow logically travel to the logical switch 830, then to the Tier-0 gateway logical router 810, Tier-1 gateway logical router 820, logical switch 832, and finally to the VM 842.

The physical elements on the left side of the pyramid in the UI 800 include an edge node 850 and a host node 852. The edge node 850 implements the Tier-0 gateway logical router 810 and the logical switch 830, as illustrated by the dashed lines 860 from the edge node 850 to each of the nodes 810 and 830. The host node 852 implements the Tier-0 gateway logical router 810, the logical switch 830, and the VM 840, as illustrated by the dashed lines 862 from the host node 852 to each of the nodes 810, 830, and 840.

On the right side of the pyramid, the physical elements include a second instance of the edge node 850 and a host node 854. In this example, the edge node 850 appears twice because it implements logical elements on the left and right sides of the pyramid. On the left side, as described above, the edge node 850 implements the logical switch 830 and the Tier-0 gateway logical router 810, while on the right side, the edge node 850 implements Tier-1 gateway logical router 820 as indicated by the dashed line 864. Also, on the right side of the pyramid, the host node 854 implements the logical switch 832 and VM 842, as indicated by the dashed lines 866.

A first tunnel 870 is displayed between the edge node 850 and the host node 852, while a second tunnel 872 is displayed between the edge node 850 and the host node 854. In some embodiments, when a data message is successfully routed, the tunnels 870 and 872 are displayed using a first color (e.g., green), and when a data message is not successfully routed, the tunnels 870 and 872 are displayed using a second color (e.g., red) to indicate the failure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
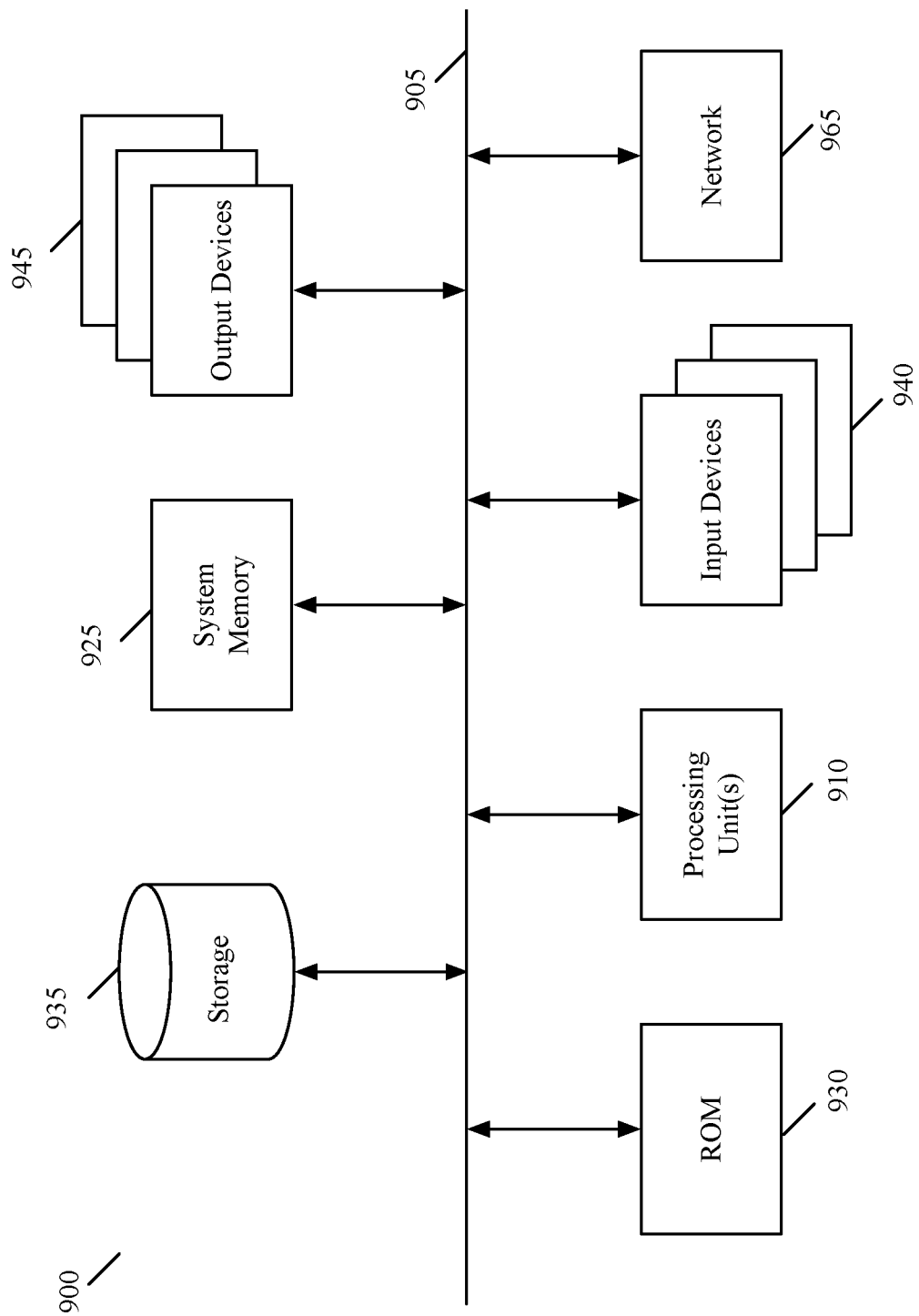
FIG. 9 conceptually illustrates a computer system with which some embodiments of the invention are implemented.

FIG. 9 conceptually illustrates a computer system 900 with which some embodiments of the invention are implemented. The computer system 900 can be used to implement any of the above-described hosts, controllers, gateway and edge forwarding elements. As such, it can be used to execute any of the above described processes. This computer system includes various types of non-transitory machine readable media and interfaces for various other types of machine readable media. Computer system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the computer system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments. The read-only-memory (ROM) 930 stores static data and instructions that are needed by the processing unit(s) 910 and other modules of the computer system. The permanent storage device 935, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such as random access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the computer system. The input devices 940 include alphanumeric keyboards and pointing devices (also called "cursor control devices"). The output devices 945 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 9, bus 905 also couples computer system 900 to a network 965 through a network adapter (not shown). In this manner, the computer can be a part of a network of computers (such as a local area network ("LAN"), a wide area network ("WAN"), or an Intranet), or a network of networks (such as the Internet). Any or all components of computer system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method for providing a visualization of a topology for a logical network implemented in a physical network, the method comprising:

identifying a set of logical elements of the logical network;

for each logical element in the set of logical elements, identifying a set of one or more physical elements in the physical network that implements the logical element, wherein a particular plurality of physical elements are identified for a particular logical element; and through a user interface (UI), displaying a visualization comprising (i) nodes representing the set of logical elements of the logical network and the sets of physical elements that implement each logical element in the set of logical elements and (ii) correlations between each logical element in the set of logical elements and the set of physical elements that implements the logical element, wherein the particular plurality of physical elements are represented as a single group node shown as correlating to the particular logical element, wherein the particular plurality of physical elements are represented as the single group node based on a number of physical elements implementing the particular logical element exceeding a threshold number.

2. The method of claim 1, wherein the visualization further comprises representations of connections between the logical elements.

3. The method of claim 1, wherein the set of logical elements are arranged hierarchically in the visualization with (i) logical elements that provide connection to external networks displayed at one end of the hierarchy, (ii) logical network endpoints displayed a second, opposite end of the hierarchy, and (iii) additional logical elements displayed in between the two ends of the hierarchy.

4. The method of claim 1, wherein:
the particular plurality of physical elements are a first plurality of physical elements identified for a first logical element;
a second plurality of physical elements are identified for a second logical element, the second plurality of physical elements comprising less than the threshold number of physical elements; and
each of the second plurality of physical elements is represented in the visualization as individual nodes correlating to the second logical element.

5. The method of claim 1, wherein a first subset of the nodes in the visualization are selectable to provide additional information regarding the elements represented by the nodes.

6. The method of claim 1, wherein:
the group node is a first group node; and
at least one plurality of logical elements in the set of logical elements is represented by a second group node.

7. The method of claim 6, wherein the particular plurality of physical elements represented by the first group node are shown as correlating to the plurality of logical elements represented by the second group node.

8. A method for providing a visualization of a topology for a logical network implemented in a physical network, the method comprising:
identifying a set of logical elements of the logical network;
for each logical element in the set of logical elements, identifying a set of one or more physical elements in the physical network that implements the logical element, wherein a particular plurality of physical elements are identified for a particular logical element; and
through a user interface (UI), displaying a visualization comprising (i) nodes representing the set of logical elements of the logical network and the sets of physical elements that implement each logical element in the set of logical elements and (ii) correlations between each logical element in the set of logical elements and the set of physical elements that implements the logical element, wherein the particular plurality of physical elements are represented as a single group node shown as correlating to the particular logical element,
wherein, for each logical element of the set of logical elements, the correlation between the logical element and the set of physical elements that implement the logical element is displayed in the visualization as a dashed line between the node representing the logical element and a set of one or more nodes representing the set of physical elements that implement the logical element.

9. A method for providing a visualization of a topology for a logical network implemented in a physical network, the method comprising:
identifying a set of logical elements of the logical network;
for each logical element in the set of logical elements, identifying a set of one or more physical elements in the physical network that implements the logical element, wherein a particular plurality of physical elements are identified for a particular logical element;
through a user interface (UI), displaying a visualization comprising (i) nodes representing the set of logical elements of the logical network and the sets of physical elements that implement each logical element in the set of logical elements and (ii) correlations between each logical element in the set of logical elements and the set of physical elements that implements the logical element, wherein the particular plurality of physical elements are represented as a single group node shown as correlating to the particular logical element;
receiving a selection of the single group node; and
in response to the selection of the single group node, (i) replacing the single group node with individual nodes representing each of the physical elements in the plurality of physical elements and (ii) panning the visualization to display all of the individual nodes in the UI.

10. A non-transitory machine-readable medium storing a program which when executed by at least one processing unit provides a visualization of a topology for a logical network implemented in a physical network, the program comprising sets of instructions for:
identifying a set of logical elements of the logical network;
for each logical element in the set of logical elements, identifying a set of one or more physical elements in the physical network that implements the logical element, wherein a particular plurality of physical elements are identified for a particular logical element; and
through a user interface (UI), displaying a visualization comprising (i) nodes representing the set of logical elements of the logical network and the sets of physical elements that implement each logical element in the set of logical elements and (ii) correlations between each logical element in the set of logical elements and the set of physical elements that implements the logical element, wherein the particular plurality of physical elements are represented as a single group node shown as correlating to the particular logical element, wherein the particular plurality of physical elements are represented as the single group node based on a number of physical elements implementing the particular logical element exceeding a threshold number.

11. The non-transitory machine-readable medium of claim 10, wherein the visualization further comprises representations of connections between the logical elements.

12. The non-transitory machine-readable medium of claim 10, wherein the set of logical elements are arranged hierarchically in the visualization with (i) logical elements that provide connection to external networks displayed at one end of the hierarchy, (ii) logical network endpoints displayed a second, opposite end of the hierarchy, and (iii) additional logical elements displayed in between the two ends of the hierarchy.

13. The non-transitory machine-readable medium of claim 10, wherein:
the particular plurality of physical elements are a first plurality of physical elements identified for a first logical element;
a second plurality of physical elements are identified for a second logical element, the second plurality of physical elements comprising less than the threshold number of physical elements; and
each of the second plurality of physical elements is represented in the visualization as individual nodes correlating to the second logical element.

14. The non-transitory machine-readable medium of claim 10, wherein a first subset of the nodes in the visualization are selectable to provide additional information regarding the elements represented by the nodes.

15. The non-transitory machine-readable medium of claim 10, wherein:
the group node is a first group node; and
at least one plurality of logical elements in the set of logical elements is represented by a second group node.

16. The non-transitory machine-readable medium of claim 15, wherein the particular plurality of physical elements represented by the first group node are shown as correlating to the plurality of logical elements represented by the second group node.

17. A non-transitory machine-readable medium storing a program which when executed by at least one processing unit provides a visualization of a topology for a logical network implemented in a physical network, the program comprising sets of instructions for:
identifying a set of logical elements of the logical network;
for each logical element in the set of logical elements, identifying a set of one or more physical elements in the physical network that implements the logical element, wherein a particular plurality of physical elements are identified for a particular logical element; and
through a user interface (UI), displaying a visualization comprising (i) nodes representing the set of logical elements of the logical network and the sets of physical elements that implement each logical element in the set of logical elements and (ii) correlations between each logical element in the set of logical elements and the set of physical elements that implements the logical element, wherein the particular plurality of physical elements are represented as a single group node shown as correlating to the particular logical element,
wherein, for each logical element of the set of logical elements, the correlation between the logical element and the set of physical elements that implement the logical element is displayed in the visualization as a dashed line between the node representing the logical element and a set of one or more nodes representing the set of physical elements that implement the logical element.

18. A non-transitory machine-readable medium storing a program which when executed by at least one processing unit provides a visualization of a topology for a logical network implemented in a physical network, the program comprising sets of instructions for:
identifying a set of logical elements of the logical network;
for each logical element in the set of logical elements, identifying a set of one or more physical elements in the physical network that implements the logical element, wherein a particular plurality of physical elements are identified for a particular logical element; and
through a user interface (UI), displaying a visualization comprising (i) nodes representing the set of logical elements of the logical network and the sets of physical elements that implement each logical element in the set of logical elements and (ii) correlations between each logical element in the set of logical elements and the set of physical elements that implements the logical element, wherein the particular plurality of physical elements are represented as a single group node shown as correlating to the particular logical element;
receiving a selection of the single group node; and
in response to the selection of the single group node, (i) replacing the single group node with individual nodes representing each of the physical elements in the plurality of physical elements and (ii) panning the visualization to display all of the individual nodes in the UI.

* * * * *